(12) United States Patent
Powell

(10) Patent No.: US 6,609,169 B1
(45) Date of Patent: Aug. 19, 2003

(54) SOLID-STATE AUDIO-VIDEO PLAYBACK SYSTEM

(76) Inventor: Jay Powell, 1316 Georgetown Way, Vernon Hills, IL (US) 60061

( * ) Notice: Subject to any disclaimer, the term of this patent is extended or adjusted under 35 U.S.C. 154(b) by 0 days.

(21) Appl. No.: 09/332,541

(22) Filed: Jun. 14, 1999

(51) Int. Cl.[7] .............................................. G06F 13/00
(52) U.S. Cl. ...................................... 710/301; 710/305
(58) Field of Search ................................ 710/301, 302, 710/126; 713/201; 364/900, 400.01; 360/27; 365/45, 230.03; 361/413; 455/223

(56) References Cited

U.S. PATENT DOCUMENTS

| | | | |
|---|---|---|---|
| 3,983,537 A | | 9/1976 | Parsons et al. |
| 4,575,780 A | * | 3/1986 | Brombal et al. ............. 361/784 |
| 4,718,044 A | | 1/1988 | Matsuyama |
| 4,777,615 A | * | 10/1988 | Potash ........................ 361/683 |
| 4,803,351 A | | 2/1989 | Shigenaga |
| 4,813,014 A | * | 3/1989 | DeBell ........................ 360/32 |
| 4,998,223 A | | 3/1991 | Akaogi |
| 5,019,920 A | * | 5/1991 | Yoshimoto et al. ........... 360/27 |
| 5,359,715 A | | 10/1994 | Heil et al. |
| 5,378,944 A | | 1/1995 | Gochi |
| 5,450,366 A | | 9/1995 | Watanabe |
| 5,522,049 A | | 5/1996 | Kimura et al. |
| 5,553,022 A | | 9/1996 | Weng et al. |
| 5,568,647 A | | 10/1996 | Kobayashi |
| 5,586,270 A | | 12/1996 | Rotier et al. |
| 5,602,999 A | | 2/1997 | Hyatt |
| 5,615,388 A | | 3/1997 | Yoshimatsu et al. |
| 5,619,728 A | | 4/1997 | Jones et al. |
| 5,699,315 A | | 12/1997 | Ko |
| 5,712,811 A | | 1/1998 | Kim |
| 5,724,529 A | | 3/1998 | Smith et al. |
| 5,729,762 A | | 3/1998 | Kardach et al. |
| 5,740,377 A | | 4/1998 | Sonobe |
| 5,745,401 A | | 4/1998 | Lee |
| 5,748,912 A | | 5/1998 | Lee |
| 5,764,934 A | | 6/1998 | Fisch et al. |
| 5,774,684 A | | 6/1998 | Haines et al. |
| 5,797,036 A | | 8/1998 | Kikinis |
| 5,798,921 A | * | 8/1998 | Johnson et al. ............... 360/32 |
| 5,802,325 A | | 9/1998 | Le Roux |
| 6,003,135 A | * | 12/1999 | Bialick et al. .............. 713/201 |
| 6,134,173 A | * | 10/2000 | Cliff et al. ............. 365/189.02 |
| 6,292,654 B1 | * | 9/2001 | Hessel et al. ................ 375/346 |
| 6,314,484 B1 | * | 11/2001 | Zulian et al. ............... 710/241 |

* cited by examiner

Primary Examiner—Rupal Dharia

(57) ABSTRACT

A completely solid state playback and recording system for enormous music and movie collections comprised of read-only and rerecordable memory. The system has no moving parts and delivers a virtually endless and expandable bus to allow a radio or movie broadcaster sized library to be stored, accessed, and programmed for playback at electronic speed. The bus can also be converted to optic fiber, retaining key bus features. Almost limitless numbers of identical memory chips can be utilized without system confusion because the system creates its own address for each memory module on the bus allowing transport and immediate reconnection of sections.

13 Claims, 18 Drawing Sheets

| EXAMPLE ACTION CODES | |
|---|---|
| (not used) | 0000 |
| Module1 | 0001 |
| Module2 | 0010 |
| Module3 | 0011 |
| Module4 | 0100 |
| Memory Info | 0101 |
| Decode Address 1 | 0110 |
| Decode Address 2 | 0111 |
| (not used) | 1000 |
| Given Code Request Code | 1001 |
| Reinitialize Code | 1010 |
| Given Code Reset | 1010 |
| Search Code Reset | 1011 |
| End Notice | 1100 |
| (not used) | 1101 |
| Search Confirm Code | 1110 |
| (not used) | 1111 |

FIG. 4

Given Code Request Input Block

Intramodule bus switch

Flip-Flop (FF) (typical)

Given & Search Code Registers

Code Comparing Logic

Given Code Output Trigger

**Given Code Reset Input Block
and Reinitialize Code Input Block**

Given Code Request Receiver

Search Code Output Trigger

DECODE

DECODE

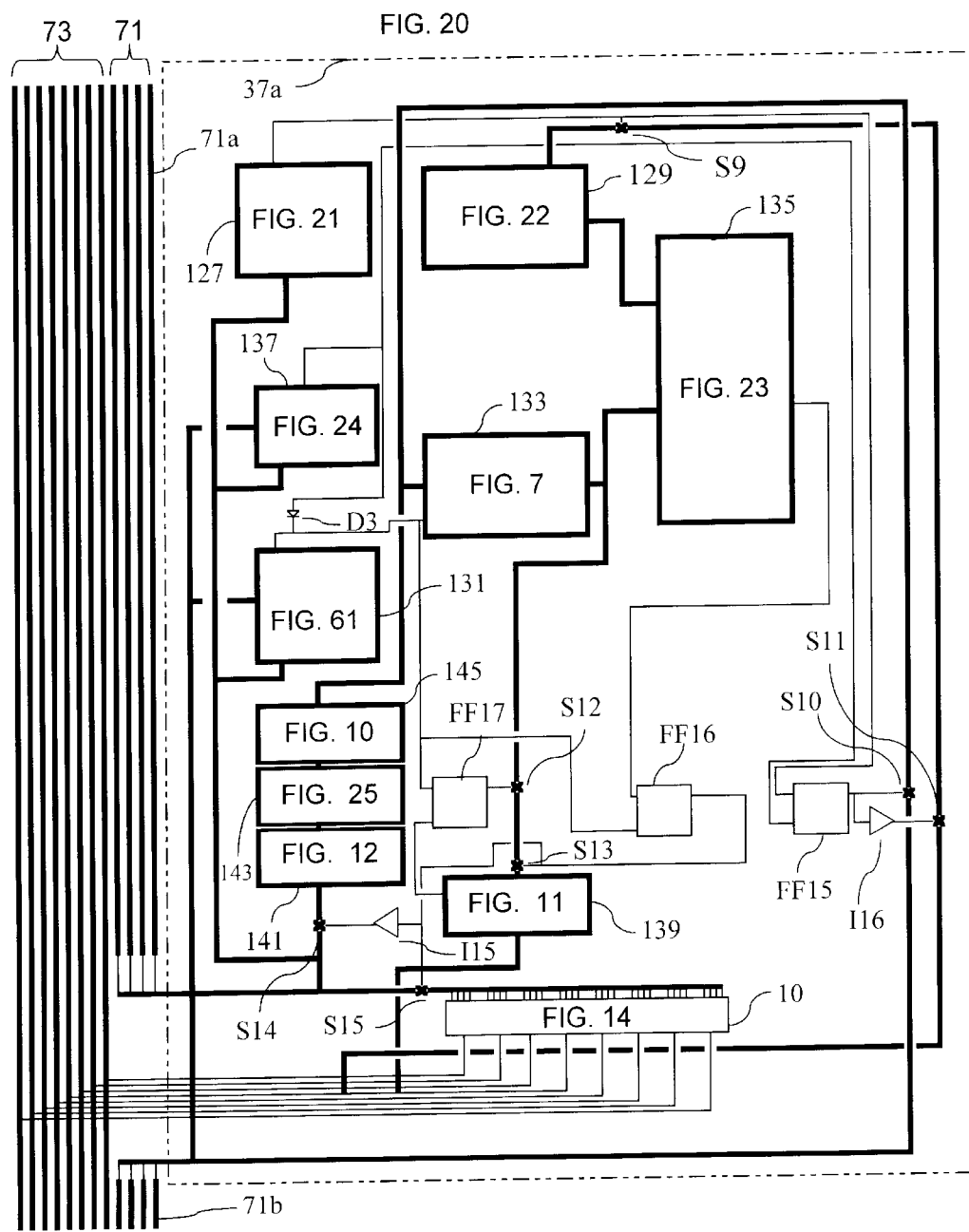

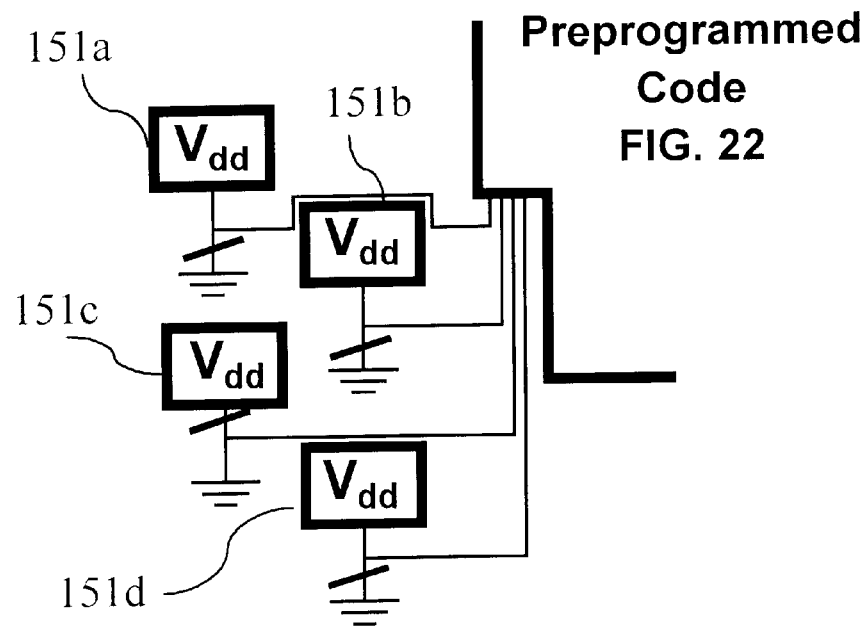
Preprogrammed Code FIG. 22
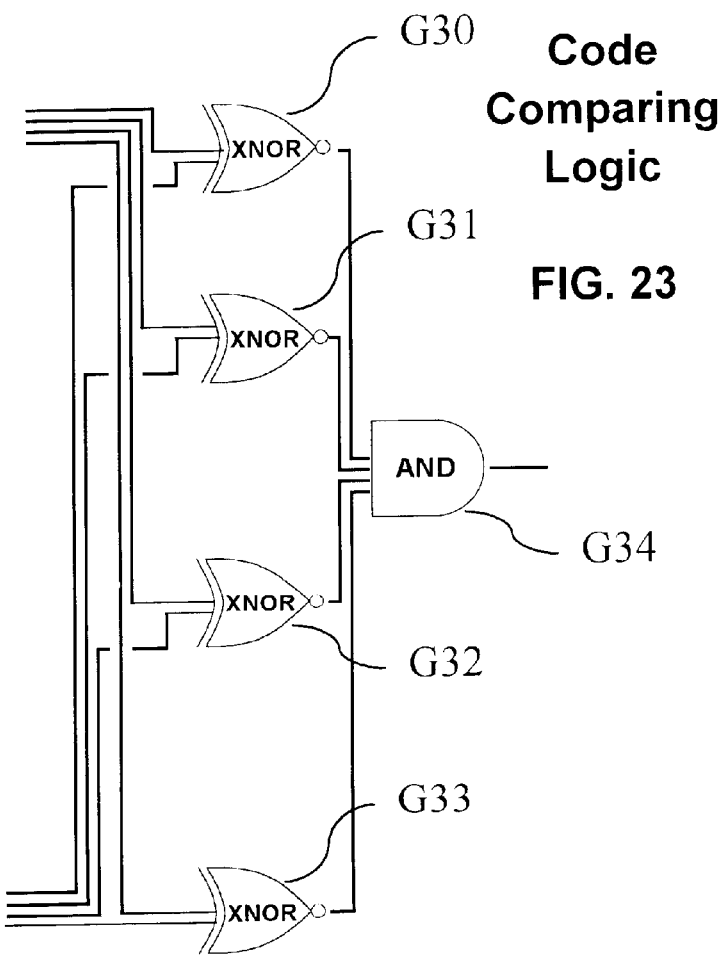
Code Comparing Logic
FIG. 23

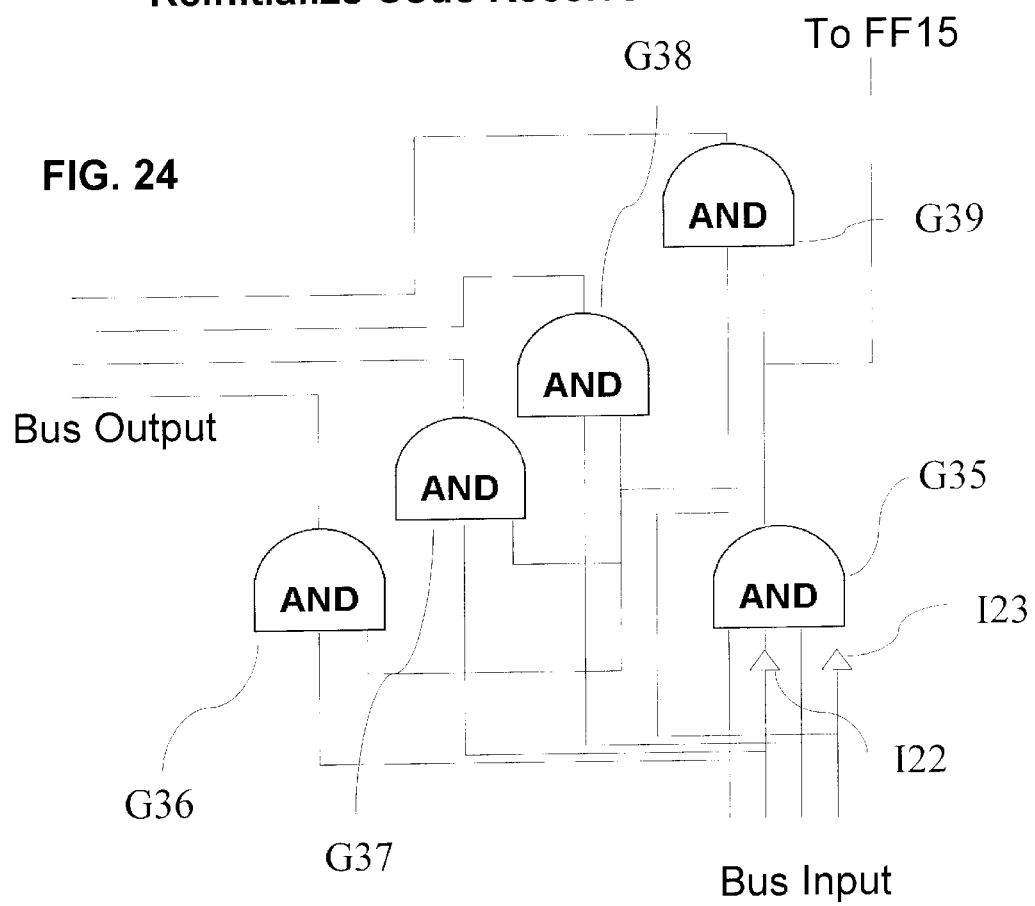

SOLID-STATE AUDIO-VIDEO PLAYBACK SYSTEM

FIELD OF THE INVENTION

This invention is directed to audio/video playback systems and, more particularly, to audio/video playback systems wherein the works to be played back are stored in digital form.

BACKGROUND OF THE INVENTION

Currently used and previously developed media, including vinyl records, audio cassettes, compact disks (CDs), videotapes, and digital video disks (DVDs), all require motors to move the storage media as it is read by a player. While some currently used and previously developed media allow multiple media to be accessed by a player, others do not. For example, CD players that store a large number of CDs are available. Other media, such as audio and video cassettes, are usually moved into and out of a player one at a time.

While, as noted above, some currently used and previously developed media can be stored in large players, for example, CD players that hold up to 100 CDs are available, the internal mechanisms of such players are noisy and the players experience wear. Multi-disk storage mechanisms for automobiles are also available. While such CD players can hold several CDs, because of vibration and moving parts, such CD players are also prone to mechanical wear. Further, CD players, particularly CD players designed for use in automobiles, require anti-shock technology and special construction in order to eliminate skipping.

One disadvantage of multiple media players, such as large and small CD players, is the inability of such players to present to a user information in user-understandable form. For example, a typical music CD player identifies the CDs in the player, but not in user-understandable form. The CD content is often displayed as "track 1," "track 2," etc. While a user may be able to identify each CD and its content if the CD player is connected to a suitably programmed device, such as a computer, conventional CD players do not in and of themselves provide information regarding the content of CDs in the player in a human-understandable form. Further, CDs and DVDs require careful handling so as to not scratch their reading surface. Such media also have the disadvantage that heat warps them. Magnetic tape media has the disadvantage that it wears as a result of contact with the reading heads. Further, magnetic tapes are prone to environmental damage, i.e., damage related to the environment in which they are utilized.

Thus, a need exists for an audio/video playback system that has the capacity to store a large number of works for selective playback. Preferably, such a system will include no moving parts and will have essentially unlimited expandability. Also, preferably, the media employed by such a system will not be subject to wear, scratching, warping, etc. The present invention is directed to providing such an audio/video playback system.

SUMMARY OF THE INVENTION

In accordance with this invention, a solid-state audio/video playback system comprising a module player and one or more module packs is provided. Each module pack is constructed to receive a plurality of solid-state modules, each of which includes solid, read-only memory integrated circuit components (e.g., ROM, PROM, EPROM, EEPROM, etc.) that digitally store audio and/or video works such as a series of songs, a movie, etc. The modules are insertable and removable from slots formed in the module packs. Each module pack includes an input bus and an output bus. The input and output buses intersect the slots so as to make contact with modules mounted in the slots. The module packs are connectable together in a daisy chain manner with one end of the chain being connected to the module player. The resulting virtually endless, expandable bus allows a collection of audio/video works, such as a classic music library or a movie library, to be stored for selection by the module player based on a user's instructions.

In accordance with further aspects of this invention, the modules include control circuits that respond to digital commands received from the module player. In one form of the invention, upon power-up or a new module being installed, the control circuits of all of the modules are reset. Thereafter, a first unique given code is transmitted by the module player and stored in a given code register included in the first module. Next, a search code that corresponds to the given code is transmitted by the module player and stored in a search code register included in the same module. After the search code is stored in the search code register, a confirmation code is sent to the module player. Thereafter, the module player uploads information from the first module that identifies the content of the first module, i.e., the content stored in the read-only memory elements. This series of steps is sequentially applied to all modules until the given code register of all modules store a unique given code and information regarding the module's content has been uploaded to the module player for access by a user.

In accordance with still further aspects of this invention, when a user selects a work to be played, the module player sends a reset code that resets the search code registers of all of the modules. The module player then sends the unique given code that corresponds to the module containing the work to be played to all of the search code registers. The module whose given code register stores the unique given code that corresponds to the unique given code stored in the search code registers sends a confirmation code to the module player. Thereafter, the confirming module enables access to the read-only memory integrated circuit components, which produce a digital data stream containing the work to be played that is sent to the module player for playback.

In accordance with alternative aspects of this invention, rather than the module player installing a unique given code in given code registers, each of the modules includes a permanent given code that uniquely identifies the module.

As will be readily appreciated from the foregoing description, the invention provides a solid-state audio/video playback system that overcomes the disadvantages of prior art audio/video playback systems. The invention includes media in the form of modules that include integrated circuit components, namely read-only memory type integrated circuit components (e.g., ROM, PROM, EPROM, and EEPROM circuits) for storing audio and video works. Because the storage medium is solid-state, moving parts are not required. Further, such storage media is not subject to wear and scratching. Furthermore, incorporating such storage medium in environmentally protected modules eliminates or substantially reduces temperature and other environmental damage.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a table of exemplary action codes suitable for use by the embodiment of the invention illustrated in FIG. 1 for controlling the electronic control circuit modules of the type illustrated in FIGS. 3 and 20;

FIG. 20 is a block diagram of an alternative embodiment of a module suitable for use in the embodiments of the invention of the type illustrated in FIG. 1;

FIG. 22 is a logic diagram of pre-programmed code logic suitable for use in the module illustrated in FIG. 20;

FIG. 23 is a logic diagram of code comparing logic suitable for use in the module illustrated in FIG. 20;

FIG. 24 is a logic diagram of a reinitialized code receiver suitable for use in the module illustrated in FIG. 20.

DETAILED DESCRIPTION OF THE PREFERRED EMBODIMENT

Figure 1:
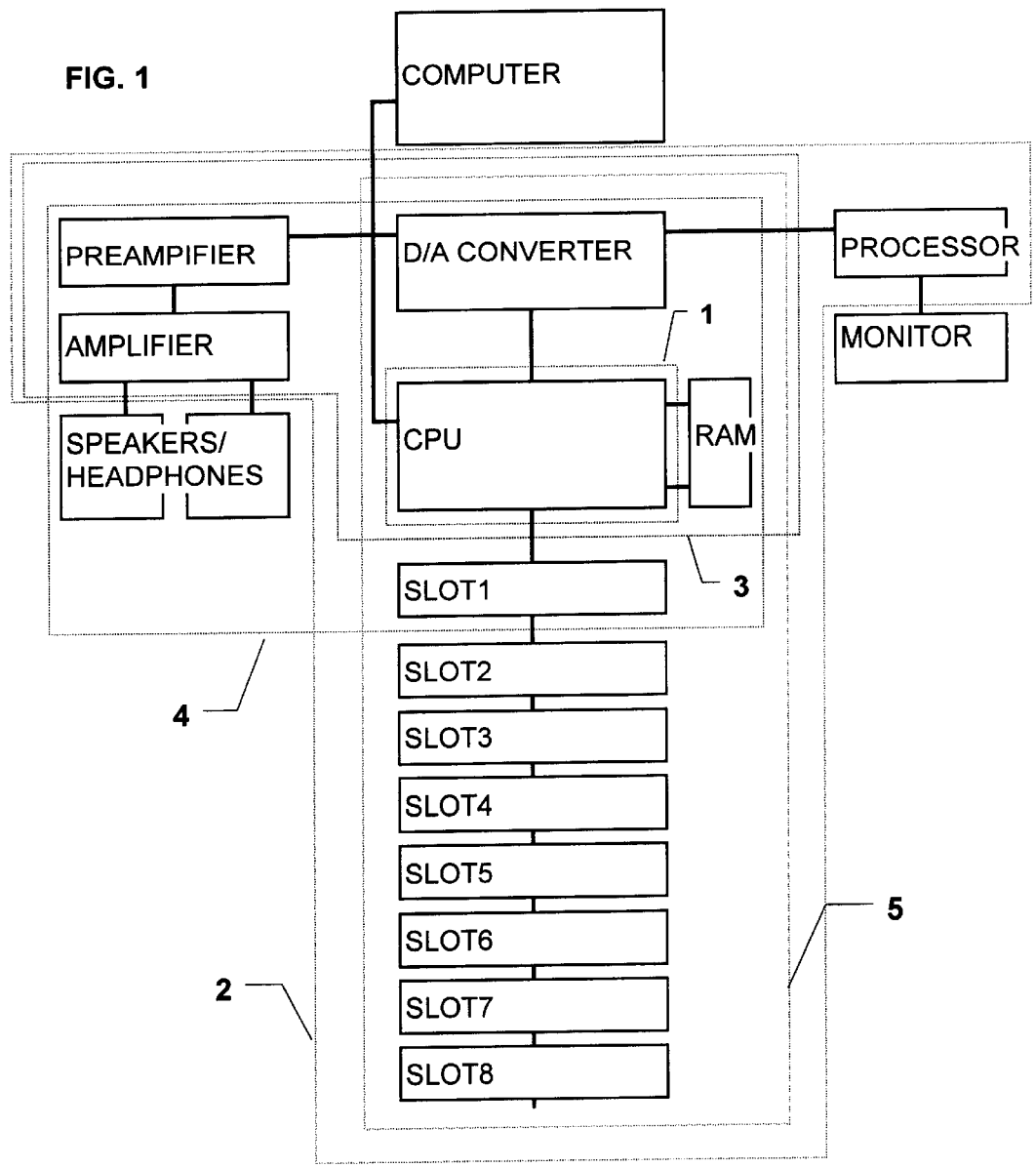
FIG. 1 is a block diagram of a solid-state audio/video playback system formed in accordance with the invention.
Figure 2:
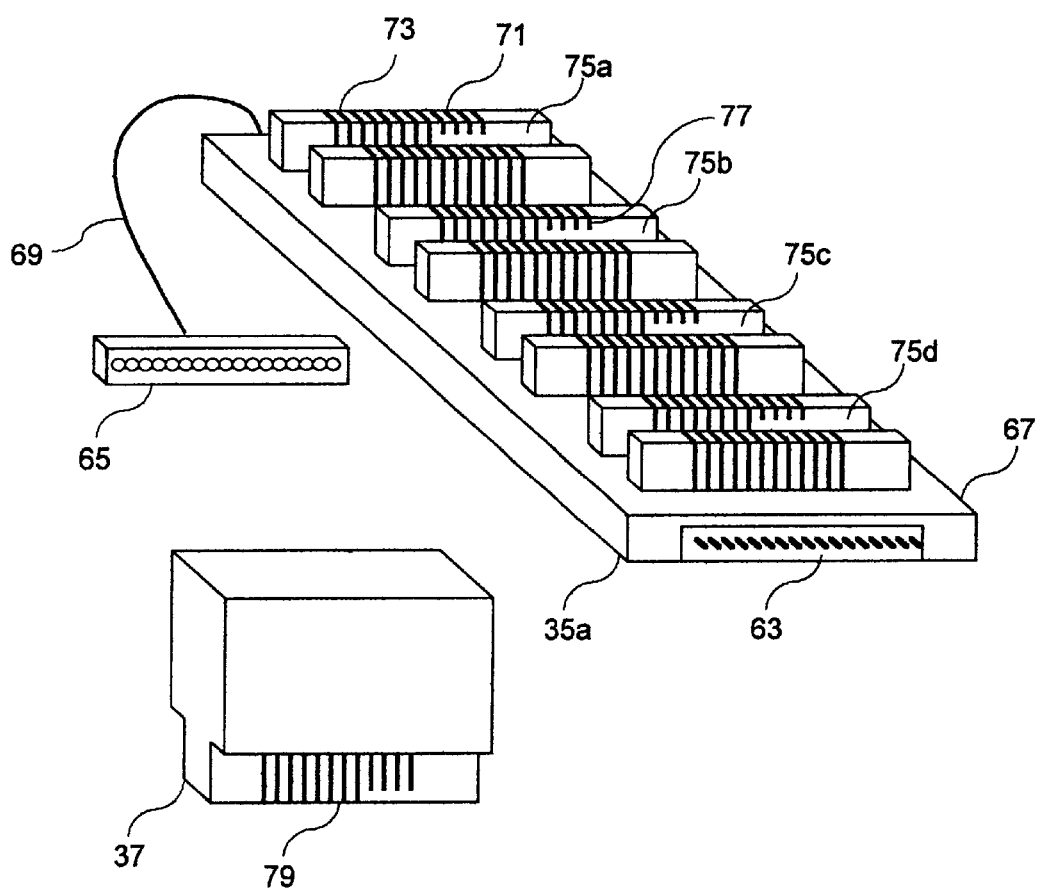
FIG. 2 is a pictorial diagram of a module pack and a module suitable for use in the embodiment of the invention illustrated in FIG. 1.

FIG. 1 illustrates a solid-state audio/video playback system 31 formed in accordance with the present invention. As will be better understood from the following description, a solid-state audio/video playback system 31 formed in accordance with the present invention includes a module player 33 and one or more module packs 35a, 35b, 35c, 35d. . . . As illustrated in FIG. 2, and described more fully below, each of the module packs 35a, 35b, 35c, 35d . . . is adapted to receive a plurality of modules 37. Each of the modules 37 houses a control circuit and a memory system formed of solid-state integrated circuit elements that store in digital form works to be played back, i.e., a music album, a movie, etc. Suitable solid-state integrated circuits include, but are not limited to, read-only memory (ROM) integrated circuits (ICs), programmable read-only memory (PROM) ICs, erasable programmable read-only memory (EPROM) ICs, and electrically erasable programmable read-only memory (EEPROM) ICs. The modules 37 are insertable into the module packs 35a, 35b, 35c, 35d . . . , in the manner described below. As shown in FIG. 1, the module packs 35a, 35b, 35c, 35d . . . are designed to be daisy-chained together so as to form a virtually endless, expandable bus. The first module pack in the chain is connected to the module player 33. As an alternative, some versions of the invention may include the first module pack integrated into the module player, or may be limited to a single module pack integrated into the module player.

As pictorially shown in FIG. 1, the module player 33 includes a controller 39, memory 41, a keyboard 43, a display 45, and a digital-to-analog (D/A) converter 47. The D/A converter 47 is connected to a suitable audio and/or video output system such as an audio amplifying system 49 or video processing system 51. As will be readily appreciated from the following description, the invention can be utilized with a variety of audio and video playback systems. As a result, the audio and video playback systems illustrated in FIG. 1 should be considered as exemplary, not limiting. For example, a D/A converter would not be acquired in a system that includes an external amplifier or digital speakers. In any event, the illustrated exemplary audio playback system 49 includes a preamplifier 53, an amplifier 55, and speakers/headphones 57a and 57b. The output of the D/A converter 47 is connected through the preamplifier 53 to the amplifier 55. In a conventional manner, the amplifier 55 is connected to the speakers/headphones 57a and 57b.

Like the audio playback system 49, the video playback system 51 can take on a variety of forms. As a result, the illustrated video playback system 51 should be considered as exemplary, not limiting. The illustrated video playback system includes a video processor 59 and a monitor 61. The output of the D/A converter 47 is connected to the video processor, which processes the output of the D/A converter and produces video signals that are applied to the monitor 61 in a conventional manner. Obviously, the video processing system 51 can include audio processing components as well as video processing components. Alternatively, the D/A converter 47 could apply video signals to the video processing system 51 and audio signals to the audio processing system 49.

As will be better understood from the following description, during an initialization sequence, the controller 39 of the module player 33 uploads information regarding the nature of the audio and video information stored in the modules mounted in the module packs 35a, 35b, 35c, 35d. . . . The uploaded information is stored in the memory 41. The uploaded information is in human-understandable form, i.e., the title of an album, song, movie, etc. The keyboard 43, which could take the form of an integral keypad as well as an external keyboard, allows a user to control the display of the uploaded information stored in the memory 41 to be displayed. The keyboard 43 also allows the user to select a work, i.e., song, movie, etc., to be played back. In response to a user's request, the controller locates the module containing the desired work and causes the work to be applied to the D/A converter 47, which converts the work from digital form into audio form and sends it to the audio playback system 49 and/or the video playback system 51. Obviously, if desired, the keyboard could be performed by a touch pad, cursor/cursor control system, or other equivalent devices or systems.

Depending on programming, in addition to displaying album, song, and movie titles, the display 45 can display cover art, selected/deselected tracks, sorted classes for random or non-random playback, altered speed playback, or segmented retrieval based upon real time. The module packs 35a, 35b, 35c, 35d . . . allow storage of an entire collection of albums, movies, etc.

Returning to FIG. 2, each of the module packs 35a, 35b, 35c, 35c . . . include a male connector 63 located at one end of a housing and a female connector 65 located at the other end. The connectors can be integrated into the housing as shown by the male connector 63 or connected to the housing via a connecting cable 69 as shown by the female connector 65. Alternatively, both connectors can be integrated into the housing or connected to the housing by a connecting cable.

The module pack 35a, 35b, 35c, 35d . . . include an input bus 71 and an output bus 73. While different bus arrangements can be utilized, preferably, the input bus 71 is segmented and the output bus 73 is continuous. Located on one side of the housing 67 of the module packs 35a, 35b, 35c, 35d . . . are a plurality of slots 75a, 75b, 75c, 75d. . . . Each of the slots includes exposed bus connectors 77 that are adapted to mate with bus terminals 79 located on the exterior surface of the modules 37. More specifically, when a module 37 is mounted in one of the slots 75a, 75b, 75c, 75d . . . of a module pack 35, the module bus terminals 79 make contact with the bus connectors 77 of the input and output buses 71 and 73. In embodiments of the invention that employ a segmented input bus 71 and a continuous output bus 73 as described herein, the modules are connected in parallel to the output bus and "jumper" the segments of the input bus. For purposes of illustration only, the input bus is shown as a four-bit parallel bus, i.e., it includes four lines, and the output bus 73 is shown as an eight-bit parallel bus, i.e., it includes eight lines. Obviously, input and output buses could have a greater or lesser number of bit lines, if desired.

Figure 3:
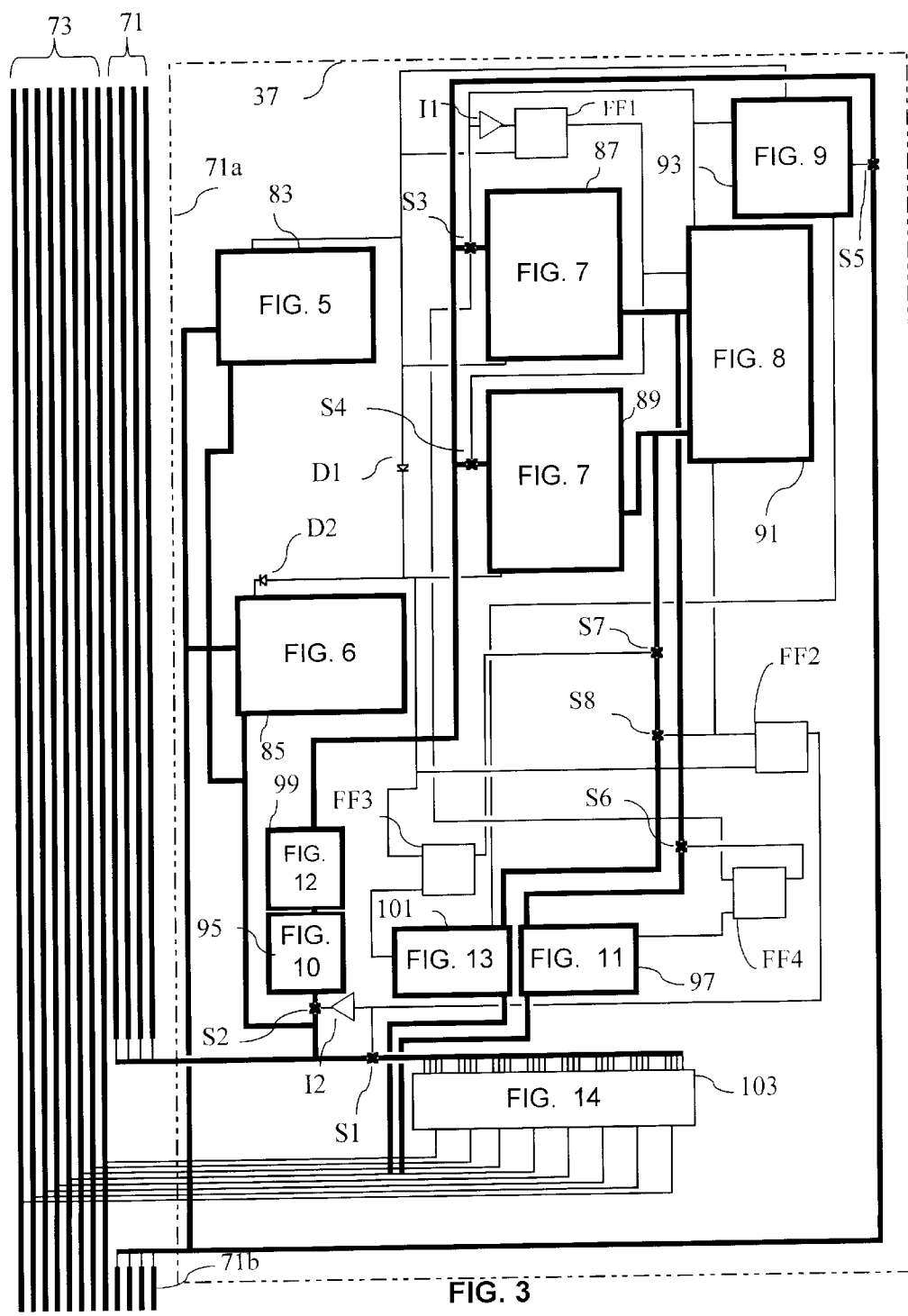
FIG. 3 is a block diagram of a module suitable for use in the embodiment of the invention of the type illustrated in FIG. 1.

As noted above, each of the modules 37 includes a module control system and one or more works to be played back, i.e., songs, movies, etc. The works to be played back are stored in digital form. FIG. 3 illustrates one embodiment of a module 37 suitable for use in a solid-state audio/video playback system formed in accordance with the invention.

The module 37 illustrated in FIG. 3 comprises: a given code reset receiver 83; a search code reset receiver 85; a given code register 87; a search code register 89; code comparing logic 91; an intramodule bus switch 93; a given code reset input block 95; a given code output trigger 97; a search code reset input block 99; a search code output trigger 101; and a memory 103. The module 37 illustrated in FIG. 3 also includes: four flip-flops designated FF1, FF2, FF3, and FF4; two inverters designated I1 and I2; two diodes designated D1 and D2; and six bus switches designated S1, S2, S3, S4, S5, and S6. FF1, FF2, FF3, and FF4 are illustrated as D flip-flops having data (D) inputs, reset (R) inputs, and data (Q) outputs. For ease of illustration, other inputs and outputs, such as clock inputs, are not shown in FIG. 3 even though some may be required and/or used in some versions of the invention.

As noted above in the illustrated embodiment of the invention, the input bus 71 is segmented and the output bus 73 is continuous. The segments of the input bus 71 are, in effect, jumped by the modules 37. As a result, as shown in FIG. 3, each module 37 is connected to an upstream or input section 71a of the input bus and a downstream or output section 71b.

As also shown in FIG. 3, lines of the upstream or input section 71 a of the input bus 71 are connected to inputs of both the given code reset receiver 83 and the search code reset receiver 85. The lines of the upstream or input section are both also connected through S1 to the control inputs of the memory 103, which stores the audio or video work(s) contained in the module 37, and through S2 to the input of the given code reset input block 95. The given code reset input block 95 has four data outputs that correspond to the input bus lines. The data outputs of the given code reset input block 95 are connected to the input of the search code reset input block 99. The search code reset input block 99 has four data outputs that also correspond to the input bus lines. The data outputs of the search code reset input block are connected through S3 and S4 to data inputs of the given code and search code registers 87 and 89, respectively. The data outputs of the search code reset input block 99 are also connected through S5 to the lines of the output section 79b of the input bus 71.

Data outputs of the given code register 87 and the search code register 89 are connected to data comparing inputs of the code-comparing logic 91. The data outputs of the given code register 87 are also connected through S6 to the input of the given code output trigger 97. The given code output trigger 97 has four data outputs that correspond to the input bus lines. The data outputs of the given code output trigger 97 are connected to four lines of the output bus 73. The data outputs of the search code register are also connected through S7 and S8 connected in series to the input of the search code output trigger 101. The search code output trigger 101 has four data outputs that correspond to the input bus lines. The data outputs of the search code output trigger 101 are connected to the same four lines of the output bus 73 as the given code output trigger 97.

The outputs of the given code reset receiver 83 and the search code reset receiver 85 are connected to the lines of the output section 71b of the input bus 71. The memory 103 has eight data outputs that are connected to the eight lines of the output bus 73.

In addition to the data interconnections described above, FIG. 3 also includes control signal interconnections. More specifically, a control output produced by the given code reset receiver 83 in the manner hereinafter described is connected to the reset input of FF1, an input of the intramodule bus switch 93, the reset input of the given code register 87, and the cathode of D1. A control output of the search code reset receiver 85 is connected to the cathode of D2. The anodes of D1 and D2 are connected together and to the reset input of the search code register 89, the reset input of FF2, and the set input of FF3. The Q output of FF2 is connected to the control input of S1 and through I2 to the control input of S2.

The code-comparing logic 91 produces two control outputs. The first control output is connected to an input of the intramodule bus switch 93 and through I1 to the D input of FF1. The same output of the code-comparing logic is connected to the control input of S3 and to the D input of FF4. The other control output of the code-comparing logic 91 is connected to the D input of FF2 and to the control input of S8. The intramodule bus switch 93 produces a control output that is connected to the control input of S5. The given code output trigger 97 produces a control output that is connected to the R input of FF4 and the Q output of FF4 is connected to the control input of S6. The search code output trigger 101 produces two control outputs. One control output is connected to the R input of FF3 and the other control output is connected to an input of the intramodule bus switch 93. The Q output of FF3 is connected to the control input of S7.

When the module player 33 is turned on or a new module is inserted, an initialization command is given. Alternatively, a user may initiate an initialization command. When an initialization command is given, the solid-state audio/video playback system 31 is initialized. Embodiments of the invention employing modules of the type generally illustrated in FIG. 3, i.e., modules having the ability to temporarily store unique given codes, as opposed to modules that store permanent codes (illustrated in FIG. 20 and described below) are initialized in the manner shown in FIG. 18. First, a given code reset code (1010 in the exemplary codes illustrated in FIG. 4) is applied to the input section 71a of the input bus 71 that is connected to the first module by the controller 39. This code, which passes through the given code reset receiver 83 of the first module, causes the control output of the given code reset receiver to shift from binary zero state to a binary one state. Since the given code reset code passes through the given code reset receiver 83, the given code reset code is applied to output section 71b of the input bus 71, which forms the input section 71a of the input bus 71 that is connected to the second module. As a result, the given code reset code is applied to the second module. This process is repeated for all of the modules connected in sequence. As will be better understood from the following description, the given code reset input block 95 is configured to prevent the given code from being forwarded to the search code reset input block 99 and, thus, logic upstream of this block.

Figure 9:
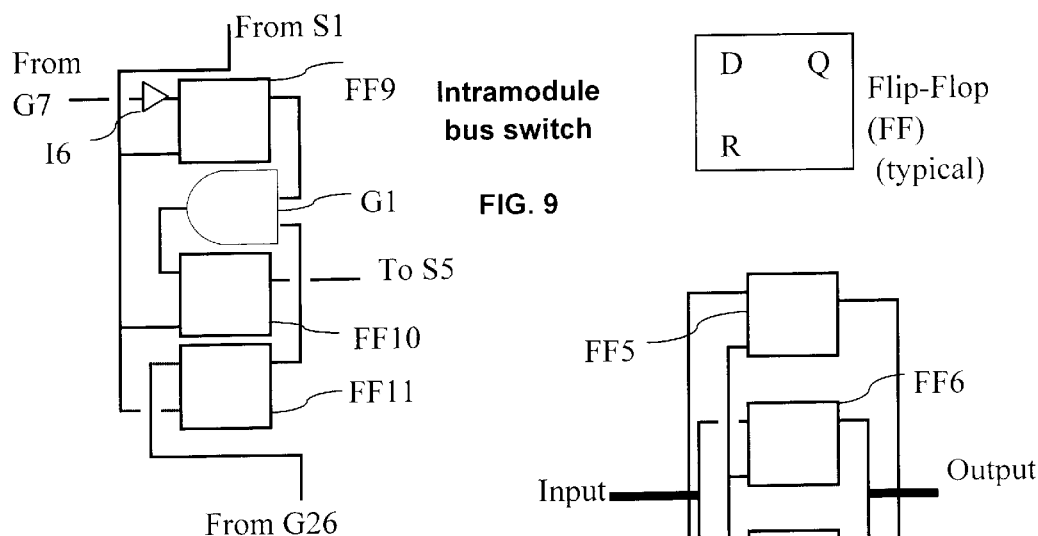
FIG. 9 is a logic diagram of an intramodule bus switch suitable for use in the module illustrated in FIG. 3.
Figure 7:
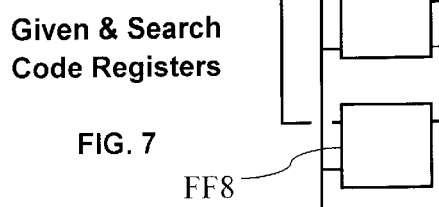
FIG. 7 is a logic diagram of a given code register or a search code register suitable for use in the module illustrated in FIG. 3 or a search code register suitable for use in the module illustrated in FIG. 20.

As noted above, upon receipt of the given code reset code, the control output of the given code reset receiver 83 shifts from a binary zero state to a binary one state. This shift resets FF1 and FF2 and sets FF3 illustrated in FIG. 3. This shift also resets flip-flops included in the given code register 87, the search code register 89, and the intramodule bus switch 93, which are illustrated in FIGS. 7 and 9 and described more fully below. Resetting the intramodule bus switch flip-flops opens S5, which prevents downstream modules from receiving the data applied to the input bus by the controller 39, except for the given code reset code, which passes through the given code reset receiver 83 as previously described. As will be better understood from the following description of a suitable given code reset receiver (FIG. 5), only the given code reset code passes through the given code reset receiver 83; other codes do not.

After all of the modules have been reset, an associated first given code (0001 in the example shown in FIG. 4) is applied to the bus by the controller 39 of the module player 33. This code will not pass through the given code reset receiver 83 because only the given code reset code passes through the given code reset receiver. However, because FF2 is reset, S2 is closed. As a result, the first given code is applied to the given code reset input block 95. This code passes through the given code reset input block 95 because the given code reset input block is not configured to block this code. This code also passes through the search code reset input block 99 because the search code input block is not configured to block this code. Thus, the first given code (0001) is applied to the given code register 87 via S3. As will be better understood from the following description of the code-comparing logic shown in FIG. 8, S3 is closed because the control output of the code-comparing logic 91 applied to S3 is in a binary one state. The first given code is not applied to the search code register 89 because S4 is open due to FF1 being reset.

Figure 18:
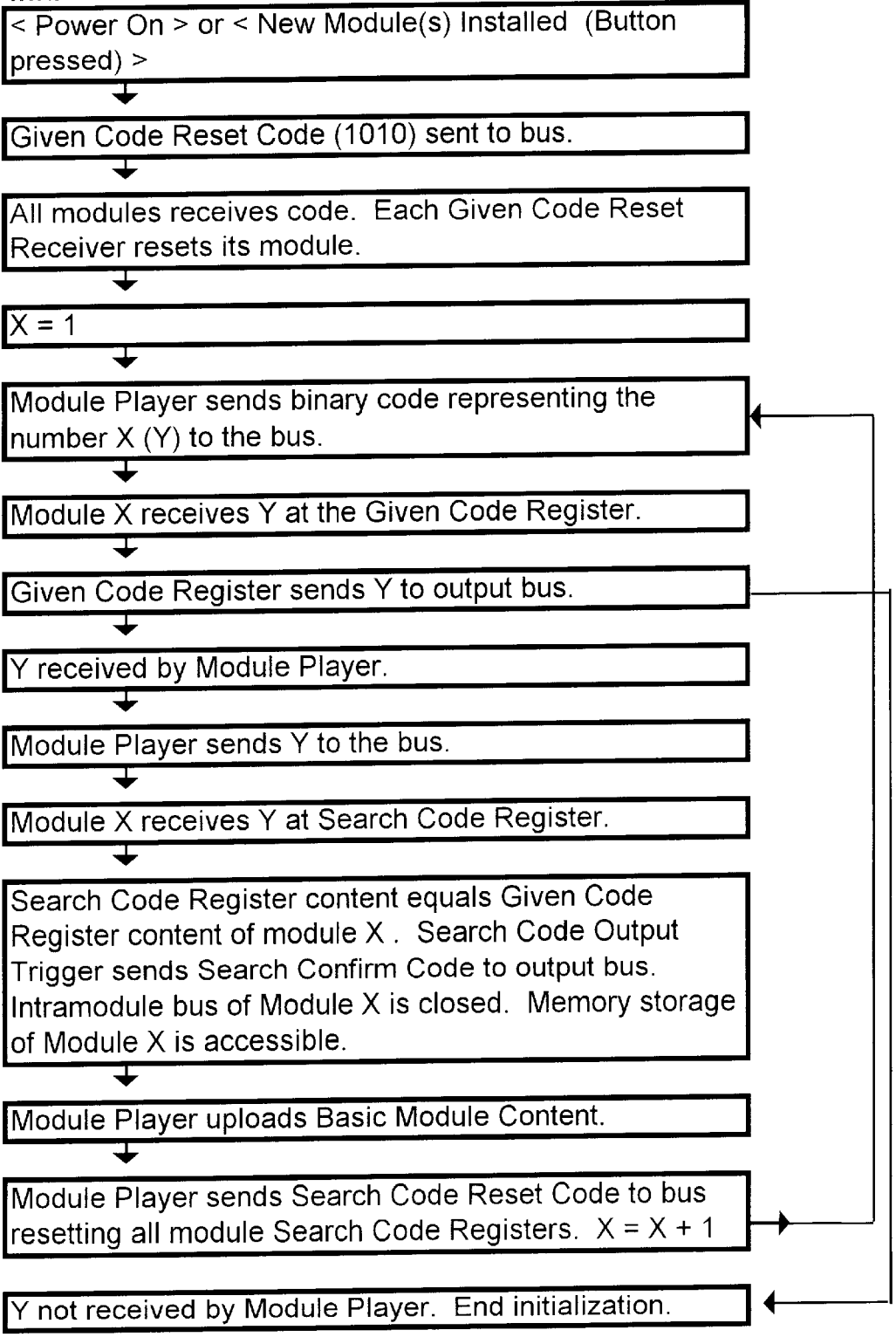
FIG. 18 is a flow diagram illustrating the initialization of a solid-state audio/video playback system of the type illustrated in FIG. 1.

The first given code, which is now latched into the given code register 87, is sent back to the controller 39 via S6, which is closed (due to FF4 being set), the given code output trigger 97 and four lines of the output data bus 73. When this occurs, the control output of the given code output trigger 97 shifts from a binary zero state to a binary one state, resetting FF4 and opening S6. As shown in FIG. 18, if the first given code is not returned to the controller 39 of the module player 31 within a preset period of time, initialization ends.

The latching of data into the given code register 87 causes one of the control outputs of the code-comparing logic 91 (the upper one in FIG. 3) to shift from a binary one state to binary zero state, opening S3, setting (via I1) FF1, and setting FF4. Setting of FF1 closes S4 and setting FF4 closes S6. As a result, the given code register 87 is prevented from receiving further codes and the search code register 89 is conditioned to receive data. As will be better understood from the following description, FF4 is immediately reset by the given code output trigger 97. This prevents the given code from being applied to the output data bus 73.

Next, as shown in FIG. 18, the controller 39 of the module player 33 applies a search code that is identical to the given code stored in the given code register to the input bus 71. Only the search code register 89 of the first module can receive this search code because the search code does not pass through the given code reset receiver 83 or the search code reset receiver 85 because the control output of the intramodule switch 93 at this point is in a binary zero state, whereby S5 is open. When the search code is latched into the search code register 89, the search code output trigger 101 applies a predetermined confirmation code (1110 in the example illustrated in FIG. 4) to four of the lines of the output bus 73 for transmission to the controller 39 of the module player 33. At this point, the same code is stored in the given code register 87 and the search code register 89. Because the same code is stored in both registers, the other output of the code-comparing logic 91 shifts from a binary zero state to a binary one state, setting FF2 and opening S8. Setting FF2 closes S1 and opens S2. Closing S1 connects the control inputs of the memory 103 to the input bus 91. Thus, the memory 103 is now available for control by the controller 39 of the module player 33. Opening S2 prevents the search and given code registers from receiving data applied to the input bus by the controller 39.

Next, the controller 39 of the module player 33 transmits a predetermined memory information code (0101 in the example shown in FIG. 4). This code causes the memory 103 to upload a basic content code, which details the basic content format, title, contents, etc., of the work(s) stored in the first module. The basic content code is followed by an end notice (1100 in the example shown in FIG. 4). The module player stores the content information in memory 41 in a "first" module location beginning at a first address preferably designated 001.

Next, the module player applies a search code reset code (1011 in the example shown in FIG. 4) to the input bus 73. Receipt of the search code reset code by the search code reset receiver 85 causes the control output of the search code reset receiver 85 to shift from a binary zero state to a binary one state. This shift resets the search code register 89, resets FF2, and sets FF3. This shift has no effect on the given code register 87, FF1, or the intramodule switch 93 because it is blocked by D1. Resetting FF2 opens S1 and closes S2. Closing S1 terminates the search code access to the memory 103.

At this point, a given code is latched into the given code register of the first module, the basic content code of the first module has been uploaded to the memory 41 of the module player, and S2 and S5 of the first module are closed, providing a code path through the first module, except for given code reset code and the search code reset code, which are blocked by the given code reset input block 95 and the search code reset input block 99.

The module player then updates its module counter by setting $X_{new}=X_{old}+1$ and applies the next given code (0010 in the example illustrated in FIG. 4) to the input bus resulting in the previous process being repeated for the second module. This process continues for each module until the module player no longer receives a given code confirmation code. If necessary, given codes and search codes are refreshed in a conventional manner in all modules, as required.

When a new module is inserted, the user is requested to refresh codes through the interface assembly, i.e., by receiving instructions from the display 45 to take certain action via the keyboard 43. Module titles and module contents are viewable on the display 45 and desired works are accessed via the keyboard 43.

Figure 19:
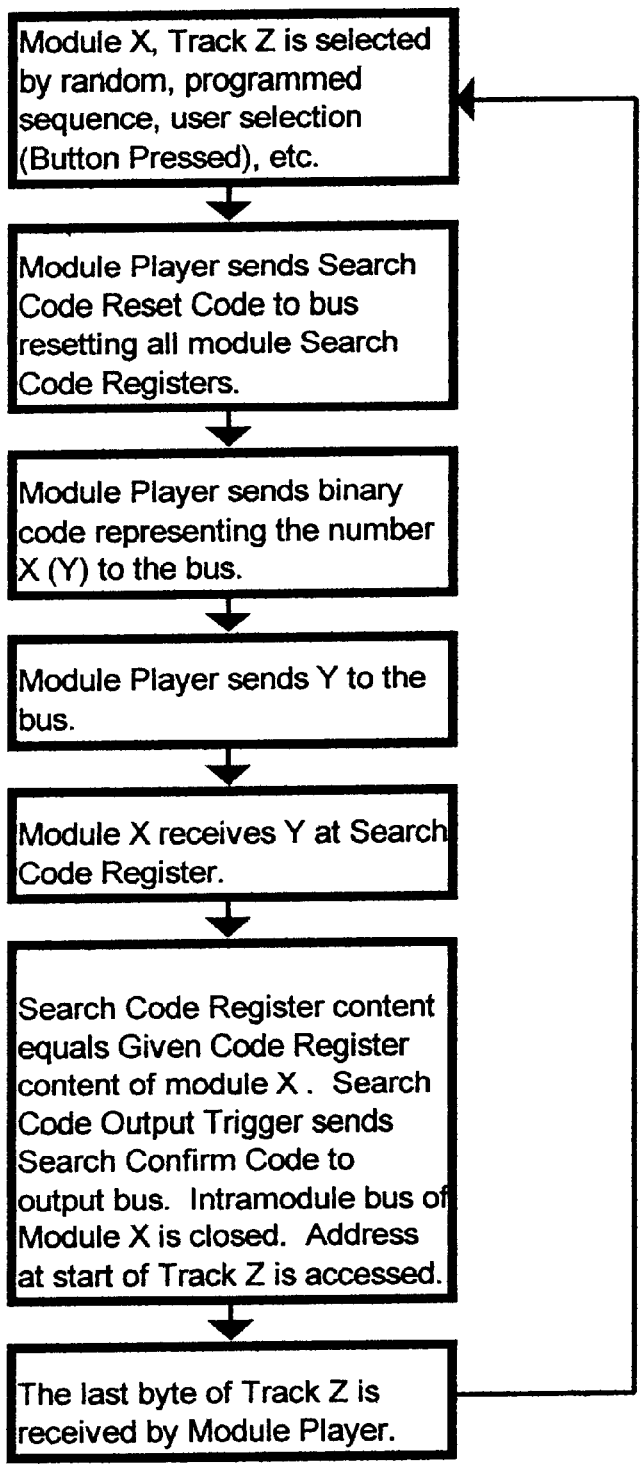
FIG. 19 is a flow diagram illustrating the playback operation of a solid-state audio/video playback system of the type illustrated in FIG. 1.

As shown in FIG. 19, when a user desires to "play" a desired selection, the module player first applies the search code reset code to the input bus 71, which resets the search code registers of all of the modules. Then the module player applies the given code of the module (X) containing the work to be played to the input bus 71. This code is received by and stored in the search code register 89 of all of the modules. However, only the module (X) storing a given code in its given code register 89 that corresponds to the search code sent by the module player responds with a search code confirm code (1110 in the example illustrated in FIG. 4). Only this module responds because only the control output of the code-comparing logic 91 of this module (X) shifts from a binary zero state to a binary one state. This shift causes S8 of this module (X) to close resulting in the search code output trigger 101 of this module (X) to produce a search code confirm code. In addition to opening S8 and, thereby, causing the search code output trigger of the selected module (X), the binary zero to binary one shift in the code-comparing logic output of the selected module (X) sets FF2. Setting FF2 closes S1 and opens S2, coupling the control inputs of the memory 103 to the input bus 71.

Figure 14:
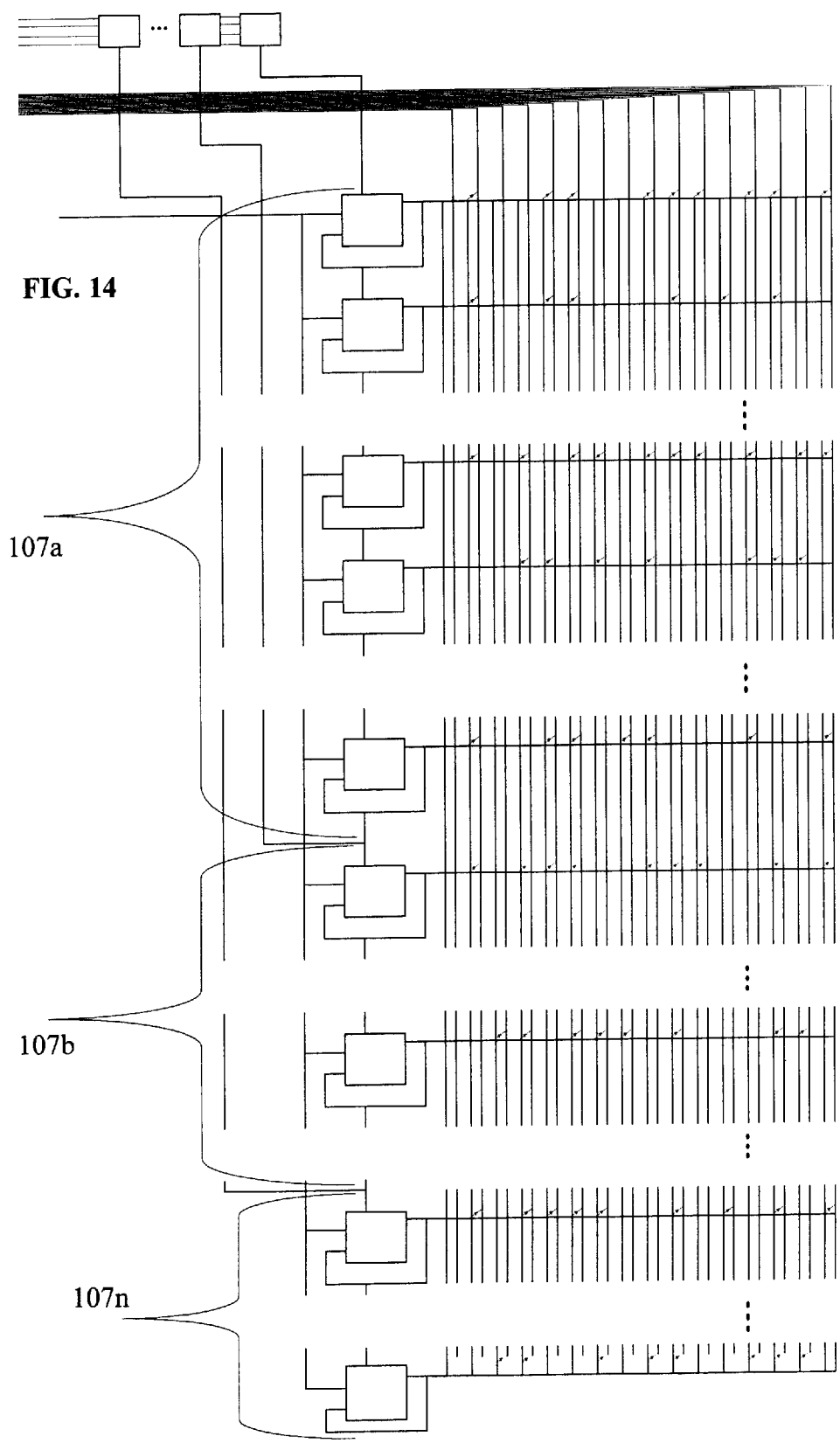
FIG. 14 is a logic diagram of a solid-state memory system suitable for use in the module illustrated in FIG. 3.
Figure 15:
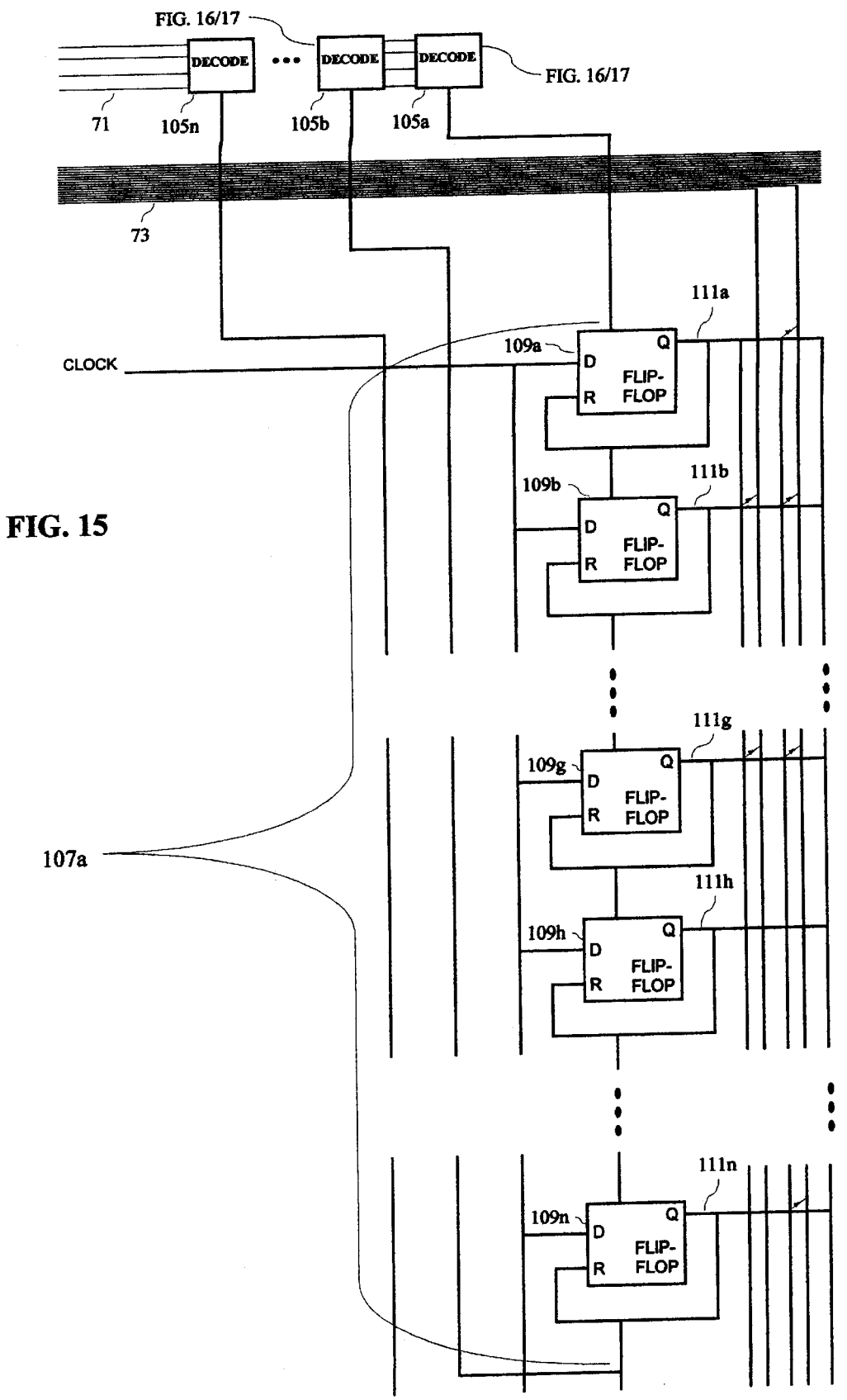
FIG. 15 is an enlargement of a portion of the solid-state memory system illustrated in FIG. 14.

Using address locations included in the basic content code previously received from the selected module, the module player applies the address of the first work to be played to the input bus 71. In response, the memory 103 of the selected module (X) sends the work stored at the chosen location (Z track) to the module player via the output bus 73. How this is accomplished is illustrated in FIGS. 14 and 15 and described below.

The module player, based upon user selections, determines whether to continue or terminate the current playback. When the user decides to terminate the current playback, or at the end of the last track of the current playback, the module player applies the search code reset code (1011 in the example illustrated in FIG. 14) to the input bus 71. This code resets all of the search code registers 87. Thereafter, the given code of the module containing the next selection is sent and the foregoing process is repeated.

Figure 5:
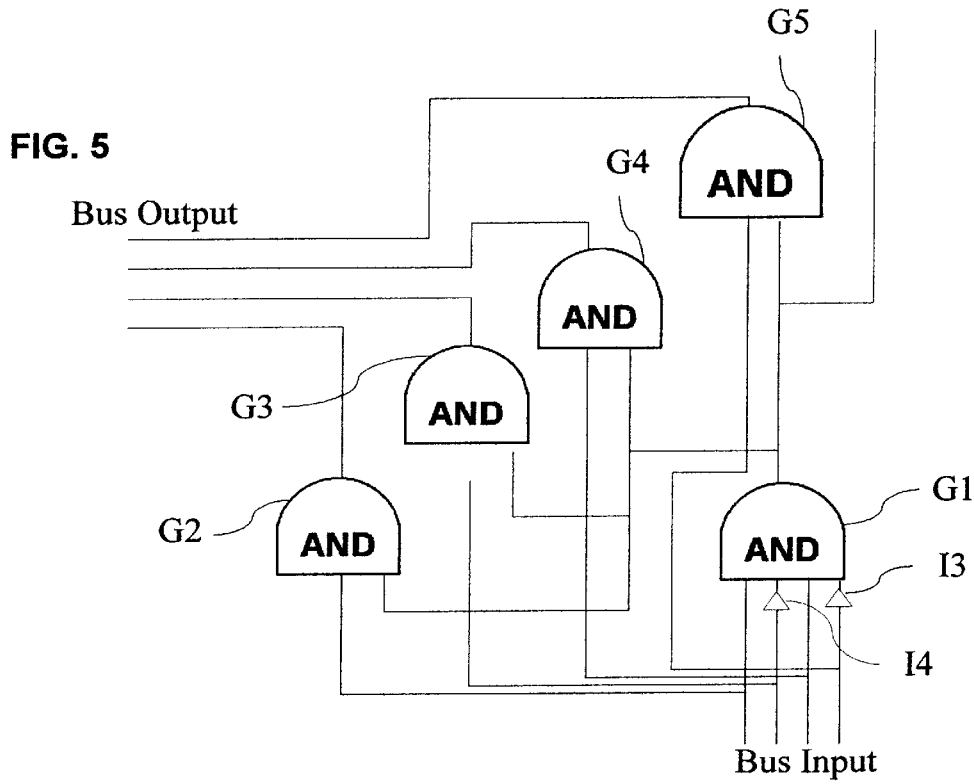
FIG. 5 is a logic diagram of a given code reset receiver suitable for use in the module illustrated in FIG. 3.

FIG. 5 is an exemplary logic diagram of a given code reset receiver suitable for use in the module control system illustrated in FIG. 3 and described above, based on the exemplary given code reset code (1010) illustrated in FIG. 4. The given code reset receiver illustrated in FIG. 5 includes a four-input AND gate designated G1, four two-input AND gates designated G2, G3, G4, and G5, and two inverters designated I3 and I4. The four lines of the input bus are connected to the four inputs of G1, two of the lines being connected through I3 and I4 such that G1 responds to the chosen given code reset code—1010, i.e., the output of G1 shifts from a binary zero state to a binary one state when the given code reset code occurs. One of the four lines of the input section 71a of the input bus 71 are also connected to one input of each of G2 through G5, i.e., one input bus line is connected to an input of G2, one input bus line is connected to an input of G3, etc. The output of G1 is connected to the other inputs of G2 through G5. The output of G1 is the reset control output illustrated in FIG. 3 and described above. The outputs of G2 through G5 are connected to the output section 71b of the input bus 71.

In operation, when the given code reset code is applied to the input bus 71 by the module player 33 in the manner previously described, the output of G1 of the first module shifts from a binary zero state to a binary one state, resetting the various flip-flops and registers in the manner previously described. When the output of G1 of the first module shifts from a binary zero state to a binary one state, G2 through G5 are enabled. As a result, the given code reset code is applied to the lines of the output section 71b of the input bus 71 associated with the first module. This causes the given code reset code to be applied to the next module. As a result, the next module is reset. This process continues until all modules are reset.

As will be readily appreciated by those skilled in the art and others familiar with logic diagrams, the given code reset receiver illustrated in FIG. 5 will only respond to one input code. Any code other than the given code reset code will cause the output of G1 to be a binary zero, whereby no reset signal will be applied to the various flip-flops and registers reset by the given code reset receiver 83. Only the given code reset code will cause the output of G1 to shift to a binary one state, resetting the flip-flops and registers and enabling G2 through G5.

Figure 6:
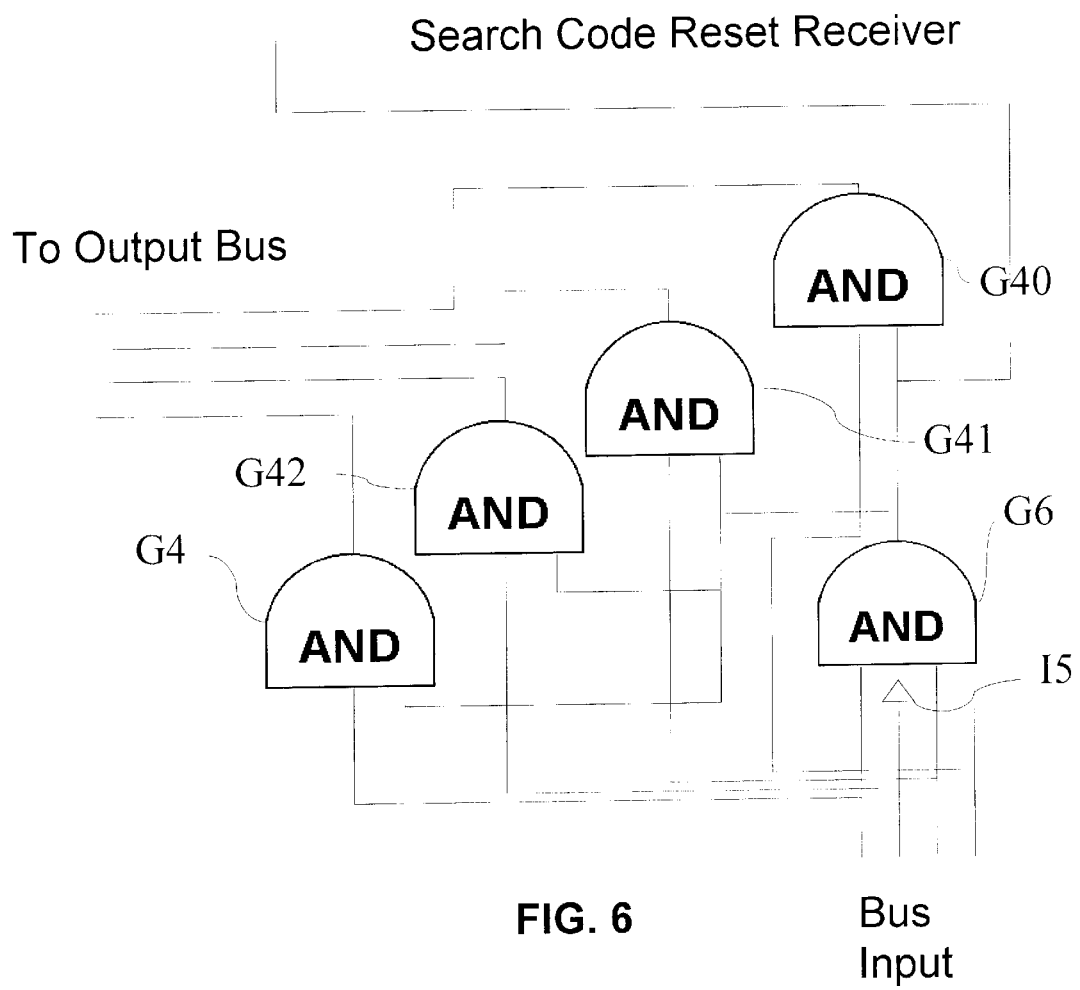
FIG. 6 is a logic diagram of a search code reset receiver suitable for use in the modules illustrated in FIGS. 3 and 20.

FIG. 6 is a logic diagram of a search code reset receiver suitable for use in the module control system illustrated in FIG. 3 and described above. The search code reset receiver illustrated in FIG. 6 comprises a single four-input AND gate designated G6; four two-input AND gates designated G40, G41, G42 and G43; and a single inverter designated I5. The inputs of G6 are connected to the lines of the input section 71a of the input bus 71 connected to the module, as shown in FIG. 3 and described above, one line connected via I5. As a result, G6 only responds to a specific search code reset code, namely 1011, in the example illustrated in FIG. 4. When this code is applied to the lines of the input section 71a of the input bus 71 connected to a module, the output of G6 shifts from a binary zero state to a binary one state resetting the search code register 89 and FF2, and setting FF3 in the manner previously described.

The output of G6 is also applied to one input each of G40, G41, G42 and G43. The other inputs of G40, G41, G42 and G43 are each connected to the lines of the input section 71a of the input bus 71. The outputs of G40, G41, G42 and G43 are each applied to one of the lines of the output section 71b of the input bus 71. As a result, when the receipt of the search code reset code causes the output G6 to shift from a binary zero state to a binary one state, G40, G41, G42 and G43 are enabled, whereby the search code reset code is applied to the output section 71b of the input bus 71.

Figure 13:
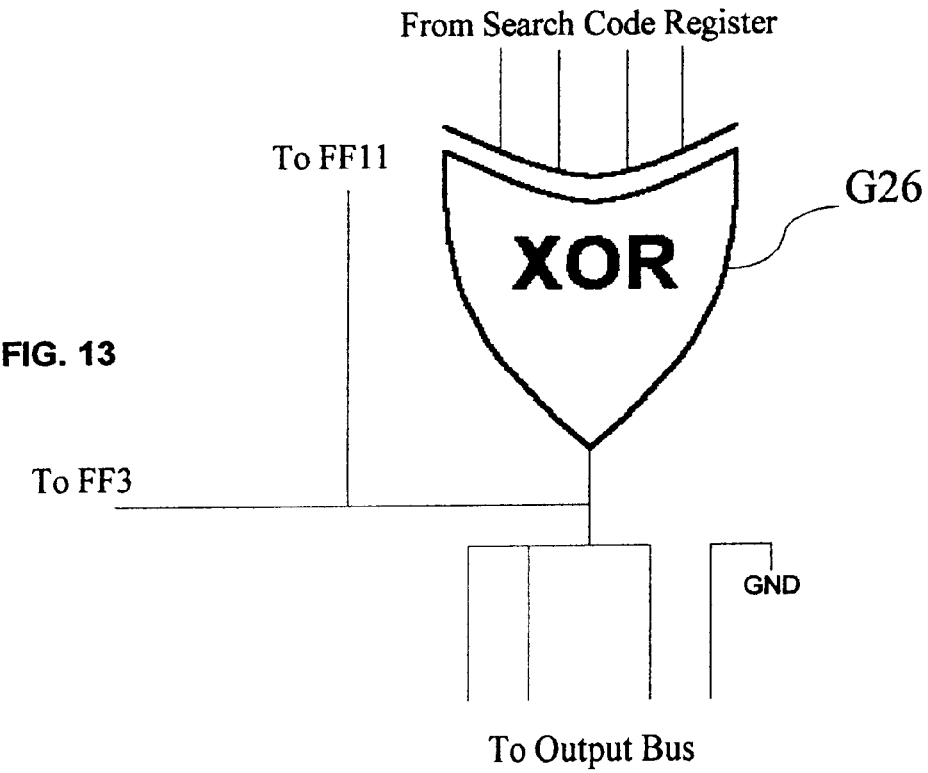
FIG. 13 is a logic diagram of a search code output trigger suitable for use in the module illustrated in FIG. 3.

FIG. 7 is a logic diagram of a four-bit register suitable for forming either the given code register 87 or the search code register 89 of the module control system illustrated in FIG. 13. The four-bit register illustrated in FIG. 7 comprises four D flip-flops designated FF5, FF6, FF7, and FF8. The bus inputs, i.e., the signals that pass through S3 or S4, are each applied to the D inputs of one of FF5 through FF6. The R inputs of FF5 through FF6 are connected to the given code reset receiver 83 and the search code reset receiver 85 in the manner previously described. The Q outputs of FF5 through FF8 are applied to the code-comparing logic 91 and 56 and 57 in the manner illustrated in FIG. 8 and described below.

As will be readily appreciated from the foregoing description of FIG. 7, the given code register and the search code register are merely multiple-bit registers that receive and store the codes that pass through their respective switches S3 or S4, until reset in the manner previously described.

Figure 8:
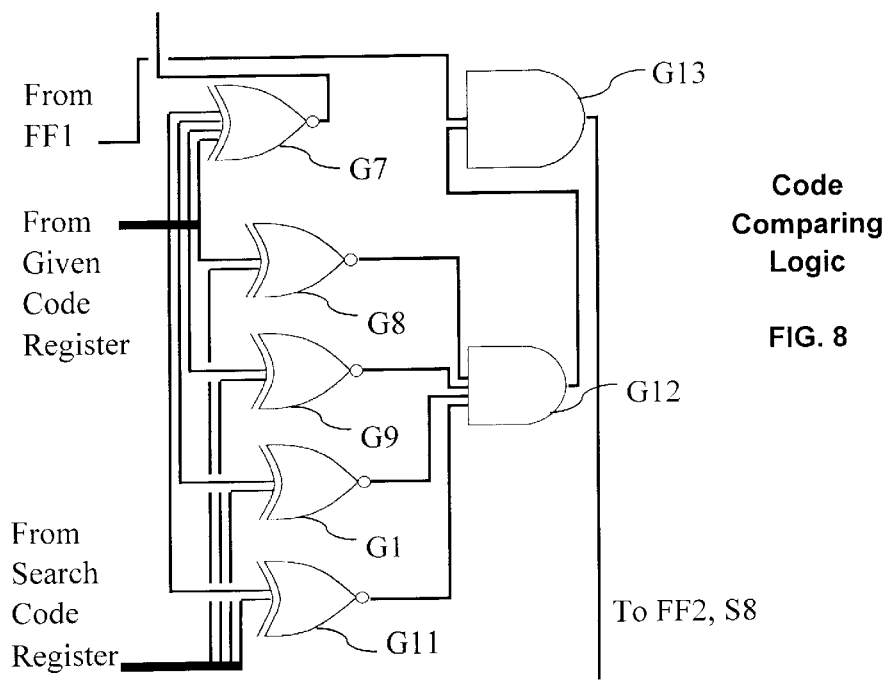
FIG. 8 is a logic diagram of code comparing logic suitable for use in the module illustrated in FIG. 3.

FIG. 8 is a logic diagram of code-comparing logic 91 suitable for use in the module control system illustrated in FIG. 3. The code-comparing logic illustrated in FIG. 8 comprises a four-input exclusive NOR gate designated G7; four two-input exclusive NOR gates designated G8, G9, G10, and G11; a four-input AND gate designated G12; and a two-input AND gate designated G13. The Q outputs of all of the flip-flops of the given code register are applied to the four inputs of G7. Further, the Q output of one of the flip-flops of the given code register 87 is applied to one input of one of G9 through G12. The Q output of one of the flip-flops of the search code register is applied to the other input of one of G8 through G11. The outputs of G9 through G12 are each applied to one of the inputs of G13. The output of G12 is applied to one input of G13. The Q output of FF1 is applied to the second input of G13. The output of G7 is applied to I1, S3, and the D input of FF4, as previously described. The output of G13 is applied to S8 and the D input of FF2, as also previously described.

In operation, the output of G9 is in a binary one state when the given code register 87 is reset, i.e., when the Q outputs of FF5 through FF8 of the given code registers are all in a binary zero state. When a given code is latched into the given code register, the Q output of at least one of the FF5 through FF8 is in a binary one state. As a result, when a given code is latched into the given code register, the output of G9 is in a binary zero state.

G8 through G11 compare the Q outputs of the flip-flops of the given code register 87 and the search code register 89. When these Q outputs are the same, the output of G12 is in a binary one state because the outputs of G8 through G11 are all in a binary one state. If the outputs are different, the output of G12 is in a binary zero state, because the output of at least one of G8 through G11 is low. If, when the output of G12 is in a binary one state, the Q output of FF1 is in a binary one state, the output of G13 is in a binary one state, closing S8 and setting FF2.

FIG. 9 is a logic diagram of an the intramodule bus switch 93 suitable for use in the module control system illustrated in FIG. 3 and previously described. The intramodule bus switch illustrated in FIG. 9 comprises: three flip-flops designated FF9, FF10, and FF11; a two-input AND gate designated G14; and an inverter designated 16. The control output of the given code reset receiver 83, i.e., the output of G1, is applied to the reset (R) inputs of FF9, FF10, and FF11. The output of G7 is applied through 16 to the D input of FF9. A control signal produced by the search code output trigger 101 in the manner hereinafter described is applied to the D input of FF11. The Q outputs of FF9 and FF11 are each applied to one of the inputs of G14 and the output of G14 is applied to the D input of FF10. The output of FF10 is applied to S5 (FIG. 3).

In operation, as previously described, the intramodule bus switch 93 (FIG. 9) is reset by the given code reset receiver 83, i.e., FF9 through FF11 are reset when the control output of the given code reset receiver 83 shifts from a binary zero state to a binary one state. Thereafter, when a given code is latched into the given code register in the manner previously described, causing the output of G7 to shift from a binary one state to a binary zero state, FF9 is set. When the search code output trigger thereafter produces a search code confirmation code in the manner previously described, and described in more detail below, FF11 is set. When FF9 and FF11 are set, the output of G14 shifts from a binary zero state to a binary one state, setting FF10. Setting FF10 closes S5.

Figure 10:
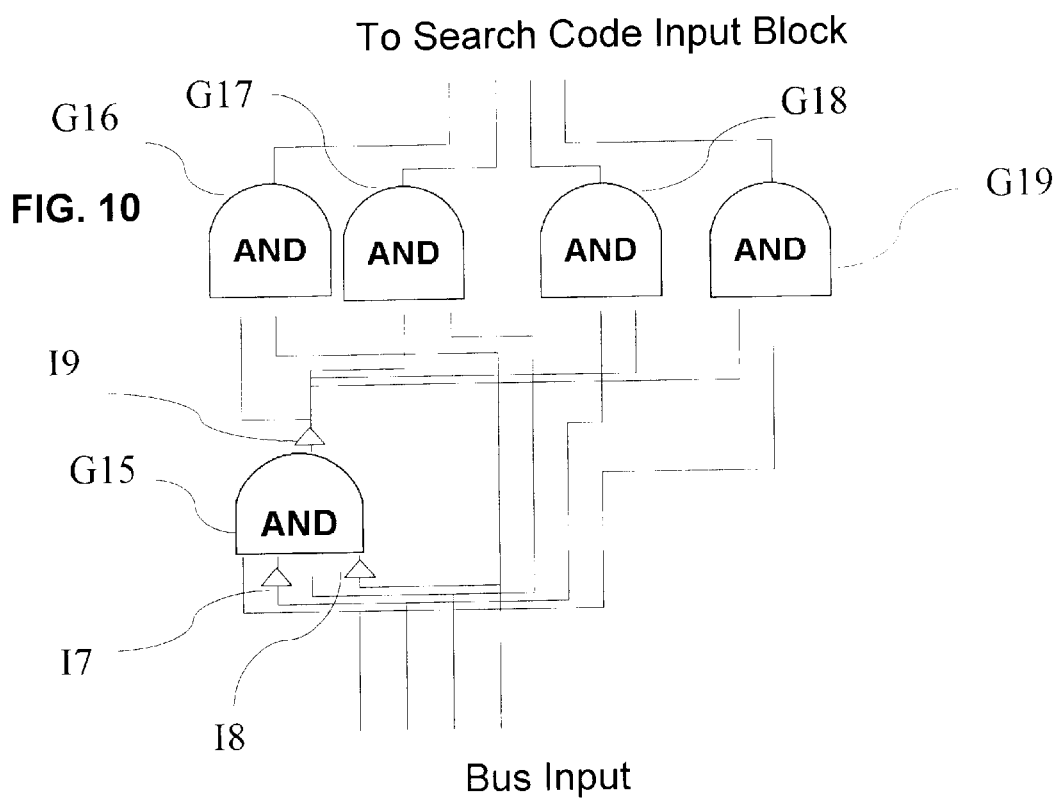
FIG. 10 is a logic diagram of a given code reset input block suitable for use in the module illustrated in FIG. 3.

FIG. 10 illustrates logic suitable for forming the given code reset input block 95 of the module control system illustrated in FIG. 3. The logic illustrated in FIG. 10 comprises a four-input AND gate designated G15; four two-input AND gates designated G16, G17, G18, and G19; and three inverters designated 17, 18, and 19. The four lines of the input section 71a of the input bus 71 are connected (through S2, FIG. 3) to the four inputs of G15, two through 17 and 18. The connection is such that the output of G15 only shifts from a binary zero state to a binary one state when the given code reset code is applied to the input of the given code reset input block. All other codes cause the output of G15 to be in a binary zero state. The output of G15 is applied through 19 to one input of each of G16, G17, G18, and G19. One of the four lines of the input section 71a of the input bus 71 is connected to the other input of one of G16, G17, G18, and G19. The outputs of G16, G17, G18, and G19 are applied to the search code reset input block 99, as illustrated in FIG. 3.

In operation, when S2 (FIG. 3) is closed, all codes, except for the given code reset code, pass through the given code reset input block 95 because all such codes cause the output of I9 to be in a binary one state, whereby G16, G17, G18, and G19 are enabled. In contrast, when the given code reset code is received by the given code reset input block 95, the output of G15 shifts from a binary zero state to a binary one state, whereby the output of I9 shifts from a binary one state to a binary zero state. The binary zero output of I9 disables G16, G17, G18, and G19, whereby the given code reset code is not applied to the search code reset input block 99 and, thus, to the given code register 87, the search code register 89, and the lines of the output section 71b of the input bus 71 via S5.

Figure 11:
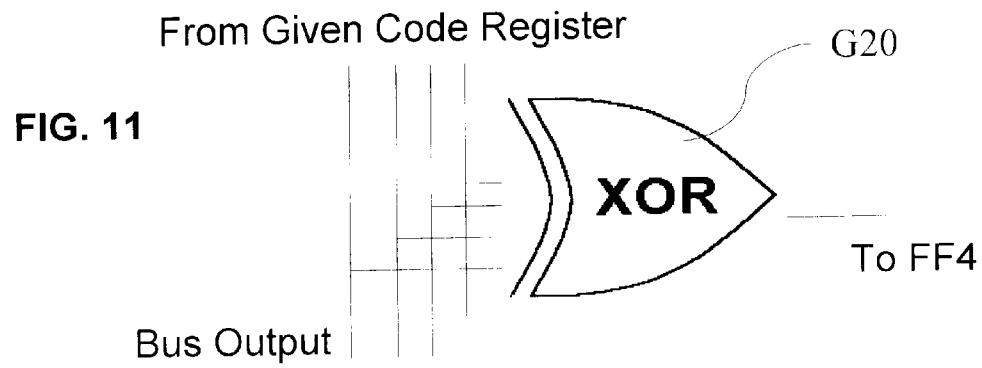
FIG. 11 is a logic diagram of a given code output trigger suitable for use in the module illustrated in FIG. 3.

FIG. 11 illustrates logic suitable for forming the given code output trigger 97 of the module control system illustrated in FIG. 3. The logic illustrated in FIG. 11 includes a single four-input exclusive OR gate designated G20. The Q outputs of the four flip-flops (FF5, FF6, FF7, and FF8) that form the given code register 87 are each applied to one of the inputs of G20. The Q outputs of the four flip-flops that form the given code register 87 also pass through the given code output trigger 97 and are applied to lines of the output bus 73 in the manner illustrated in FIG. 3 and described above. When all of the inputs of G20 are in a binary zero state, either because the given code register 87 has been reset or because S6 is closed, the output of G20 is in a binary zero state. When S6 is open and a given code is stored in the given code register 87 (which means that one of the Q outputs of FF5, FF6, FF7, or FF8 is high), the output of G20 is in a binary one state. When the output of G20 is in a binary one state, FF4 is reset. Resetting FF4 closes S6. As a result, simultaneously with a given code register output 87 being returned to the module player via the given code output trigger 97 in the manner previously described, FF4 is reset, whereby S6 is opened. Opening S6 stops the given code latched into the given code register 87 from being applied to the output bus 73.

Figure 12:
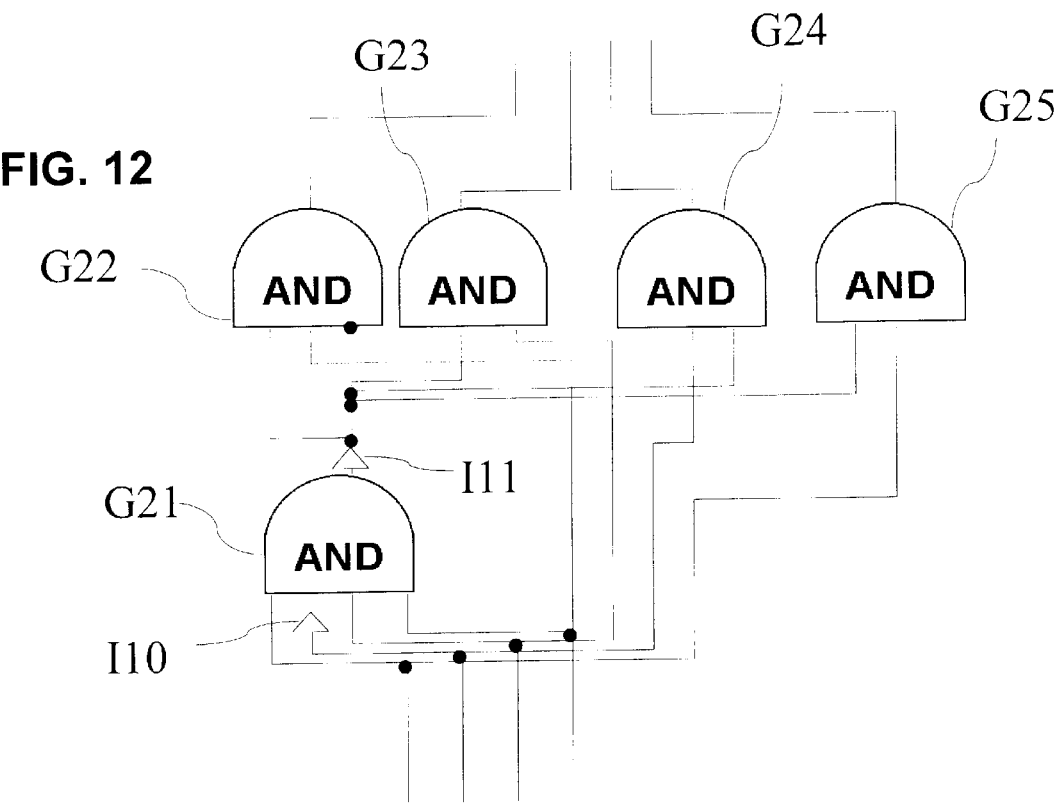
FIG. 12 is a logic diagram of a search code reset input block suitable for use in the modules illustrated in FIGS. 3 and 20.

FIG. 12 illustrates logic suitable for forming the search code reset input block 99 of the module control system illustrated in FIG. 3. The logic illustrated in FIG. 12 comprises: a four-input AND gate designated G21; four two-input AND gates designated G22, G23, G24, and G25; and two inverters designated I10 and I11. The output of the given code reset input block 95, i.e., the outputs of G16, G17, G18, and G19 are applied to the four inputs of G21, one through I10. The output of the search code input block 95, i.e., the outputs of G16, G17, G18, and G19 are also applied to one input of each of G22, G23, G24, and G25. The output of G21 is applied through I11 to the other inputs of G22, G23, G24, and G25. As with the given code reset input block 95, the search code reset input block 99 passes all codes it receives, except for the search code reset code. When the search code reset code occurs, the output of G21 shifts from a binary zero state to a binary one state. This causes the output of I11 to shift from binary zero state to a binary one state disabling G22, G23, G24, and G25. All other codes cause the output of AND 15 to be in a binary zero state. This causes the output of I11 to be in a binary one state, enabling G22, G23, G24, and G25 to pass the code applied to the other input of these gates.

In summary, the given code reset input block prevents the given code reset code from being applied to S3, S4, and S5, and the search code reset input block prevents the search code reset code from being applied to S3, S4, and S5. All other codes pass through the given code reset input block 95 and the search code reset input block 99 and are applied to S3, S4, and S5, provided S2 is closed.

FIG. 13 illustrates logic suitable for forming the search code output trigger 101 of the module control system illustrated in FIG. 3. The search logic illustrated in FIG. 13 comprises a single four-input exclusive OR gate designated G26. The output of the four flip-flops that form search code register 89, i.e., the Q outputs of FF5, FF6, FF7, and FF8 (FIG. 7), are each applied to one of the inputs of G26 via S7 and S8. As a result, if S7 and S8 are closed, and the search code register stores anything other than a reset code (0000), the output of G26 is in a binary one state. If the search code register is reset, the output of G26 is in a binary zero state.

The output of G26 forms three of the bus outputs of the search code input trigger 101. The fourth output is connected to ground. As a result, when the output of G26 shifts to a binary one state, the search code output trigger 13 produces the search code confirmation code 1110 illustrated in FIG. 4 and described above. As shown in FIG. 3 and previously described, this confirmation code is sent back to the module player via four lines of the output bus 73.

Figure 16:
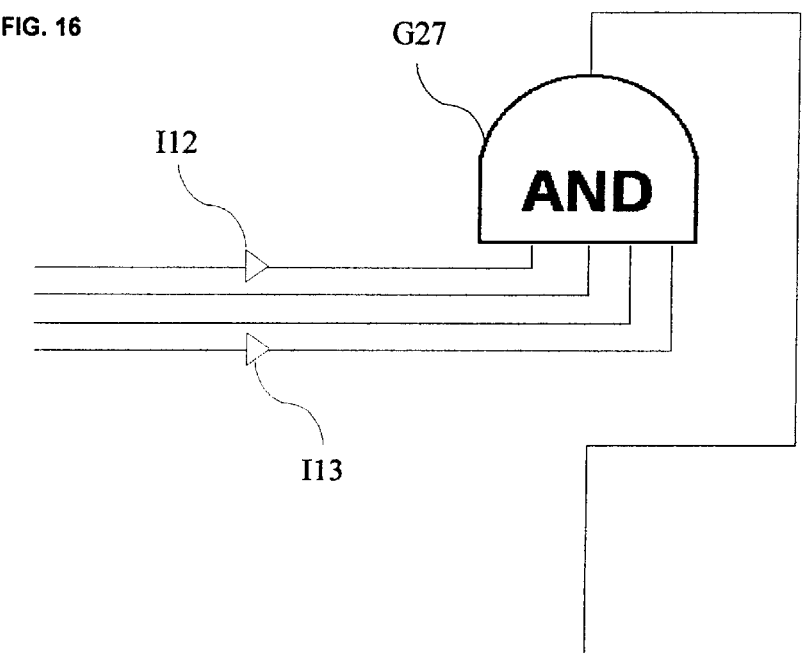
FIG. 16 is an exemplary logic diagram of decoder logic suitable for use in the solid-state memory system illustrated in FIGS. 14 and 15.
Figure 17:
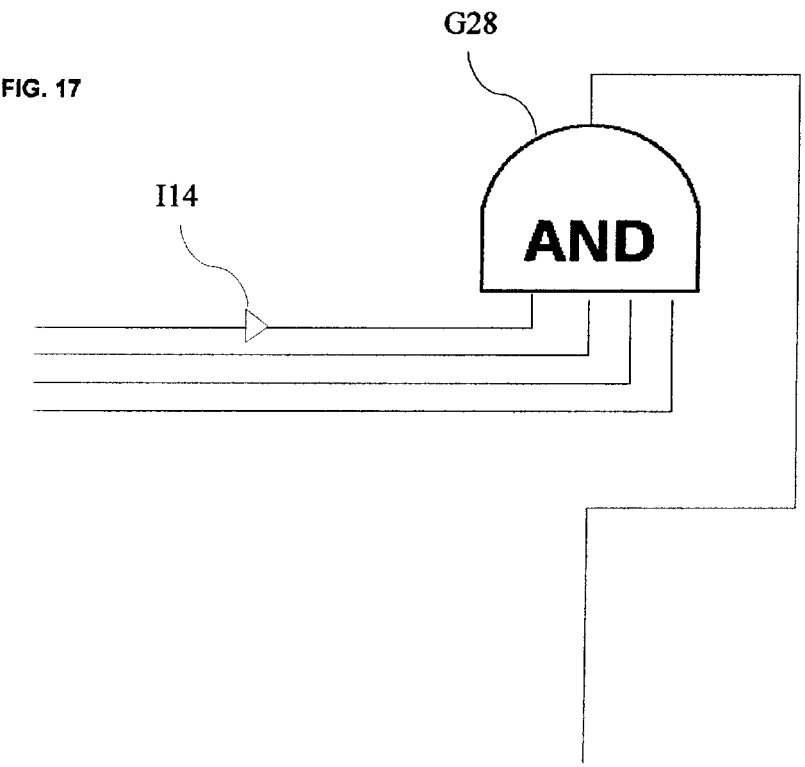
FIG. 17 is an alternative exemplary diagram of decoder logic suitable for use in the solid-state memory system illustrated in FIGS. 14 and 15.

FIG. 14 illustrates a memory 103 suitable for use in a module 37 of the type illustrated in FIG. 3. The memory illustrated in FIG. 14, a portion of which is illustrated in enlarged form in FIG. 15, includes a series of decoders 105a, 105b, 105c . . . 105n for decoding memory access codes applied to the input bus 71 by the module player 33 in the manner previously described. Examples of suitable decoders are illustrated in FIGS. 16 and 17 and described below. Each of the decoders 105a, 105b, 105c . . . 105n responds to a unique code. The memory also includes a plurality of sections 107a, 107b . . . , each of which includes a plurality of flip-flops that respond to the output of one of the address decoders 105a, 105b . . . 105n shifting from a binary zero state to a binary one state. More specifically, the D input of the first flip-flop 109a of each of the sections 107a, 107b . . . is connected to the output of one of the address decoders 105a, 105b. . . . The Q output of each of these flip-flops is applied to the reset (R) input of the same flip-flop and to the D input of the next flip-flop in the section. Thus, for example, the Q output of flip-flop 109a of the first section 107a is connected to the reset input of flip-flop 109a of section 107a and to the D input of flip-flop 109b of section 107a. Further, the Q output of the last flip-flop in a section is applied to the D input of the first flip-flop in the next section. Thus, for example, the Q output of flip-flop 109n of section 107a is applied to the D input of flip-flop 109a of section 107b. As a result of this arrangement, setting the first flip-flop of a section causes all of the flip-flops in the section to be sequentially set and then reset, followed by the sequential setting and resetting of the flip-flops of the next section until the last flip-flop 109n of the last section 107n is set and reset.

The Q output of each flip-flop is connected to a data bit line 111a, 111b, 111c . . . 111n. When a flip-flop is set, the stored data associated with the related bit line is applied to the output bus 73, in a conventional manner. As a result, the stored data associated with the individual bit line 111a, 111b, 111c . . . is sequentially applied to the output data bus 73 as the flip-flops are sequentially set and reset. As a result of the connection between the last flip-flop of a section and the first flip-flop of the next section, the sections can be sequentially "played" in series. Alternatively, playback can start between sections, depending upon the address supplied to the address decoders 105a, 105b . . . 105n.

While not shown for ease of simplicity in FIGS. 3, 7, and 9, clock inputs of the flip-flops are shown in FIGS. 14 and 15. In a conventional manner, the data at the D input or the R inputs of the flip-flops is loaded into the flip-flops when a clock pulse generated by a clock source (not shown) is applied to the clock inputs of the flip-flops. The data associated with the bit lines is, of course, the audio and/or video data stored in the memory module.

The binary output that occurs when the bit line 111n associated with the last flip-flop 109n of the last section 107n identifies the end of the audio track, i.e., song, album, movie, etc. The module player, based upon user selections, then determines whether to continue or terminate the current playback. To terminate playback, the module player applies the search code reset code (1011 in the example shown in FIG. 4) to the input bus 71. This resets all of the search code registers 89 in the manner previously described, opening S1 and closing S2.

FIGS. 16 and 17 are examples of decoders suitable for use in the memory illustrated in FIGS. 14 and 15 and described above. Each of the decoders includes a single four-input AND gate designated G27 in FIG. 16 and G28 in FIG. 17. Each of the decoders also includes one or more inverters connected to one or more of the inputs of the AND gate of the decoder. Two inverters designated I12 and I13 are included in FIG. 16 and a single inverter designated I14 is included in FIG. 17. The lines of the input section 71a of the input bus 71 are connected in parallel to all of the decoders 105a, 105b . . . 105n via S1. When a suitable code is received, the output of the AND gate decoder responsive to the received code shifts from a binary zero state to a binary one state. In the case of FIG. 16, the code 0110 causes the output of G27 to shift from a binary zero state to a binary one state. In the case of FIG. 17, the code 0111 causes the output of G28 to shift from a binary zero state to a binary one state.

In summary, modules 37 of the type illustrated in FIG. 3 are individually coded during an initialization coding sequence. More specifically, during the initialization coding sequence, a given code is stored in the given code register of each of the modules. The modules are sequentially coded in that the first given code is stored in the first module, the second given code is stored in the second module, etc. This is accomplished by first resetting all of the modules and then sending the first given code to the first module. In response, the first given code is stored in the given code register 87 of the first module and the given code is sent back to the module player. Thereafter, the same code is sent to the search code register of the first module. After storage, the first module sends a confirm code to the module player. Thereafter, the basic content code stored in this module is uploaded to the module player. Then, the search code register of the first module is reset. After all of the modules have been encoded and their basic content code updated in the foregoing manner, initialization is complete. Thereafter, when data stored in a particular module is desired, the code identifying that module is produced by the module player. The code is received by the search code register of all of the modules. However, only the module having the same code stored in the given code register responds. After responding, the data stored in the memory of the accessed module is available for playback.

FIG. 20 illustrates an alternative embodiment of a module 37a formed in accordance with the invention. The primary difference between the module illustrated in FIG. 20 and the module illustrated in FIG. 3 is that the access code of the module illustrated in FIG. 3 is programmable in the manner previously described. In contrast, the module illustrated in FIG. 20 is pre-programmed, i.e., the module access code is not controllable by the module player. Rather, as will be better understood from the following description, the module is pre-programmed prior to use.

The module 37a illustrated in FIG. 20 comprises: a given code request receiver 127; a pre-programmed code 129; a search code reset receiver 131; a search code register 133; code comparing logic 135; a reinitialize code receiver 137; a search code output trigger 139; a search code input block 141; a given code request input block 143; a reinitialize code input block 145; a diode designated D3; six switches designated S9, S10, S11, S12, S13, and S14; two inverters designated I15 and I16; and three D flip-flops designated FF15, FF16, and FF17. The module 37a illustrated in FIG. 20 also includes a memory 103 similar to the memory of the module illustrated in FIG. 3 and described above.

The lines of the input section 71a of the input bus 71 are connected to the inputs of: the given code request receiver 127, the reinitialize code receiver 137, and the search code reset receiver 131. The lines of the input section 71a of the input bus 71 are also connected through S14 to the input of the search code input block 141 and through S15 to the control inputs of the memory 103. The data output of the search code input block 141 is applied to the input of the given code request input block 143, and the data output of the given code request input block is applied to the input of the reinitialization code input block 145. The data output of the reinitialization code input block 145 is applied to the input of the search code register 133 and through S10 to the lines of the output section 71b of the input bus 71. The data outputs of the programmed code block 129 and the search code register 133 are each applied to a data input of the code-comparing logic 135. The data output of the programmed code block 129 is also applied through S9 and S11, in series, to four lines of the output bus 73. The data output of the search code register 133 is also applied through S12 and S13, in series, to the input of the search code output trigger 139. The data output of the search code output trigger is applied to four of the lines of the output bus 73.

The given code request receiver 127 has a control output that is connected to S9 and the D input of FF15. The search code reset receiver 131 has a control output that is connected to the reset input of the search code register 133, the reset (R) input of FF16, and the D input of FF17. The control output of the search code reset receiver 131 is also connected through D3 (anode-to-cathode) to the R input of FF15. The reinitialize code receiver 137 has a control output that is also connected to the R input of FF15. The search code output trigger 139 has a control output that is applied to the R input of FF17. The Q output of FF15 is applied to the control input of S10 and through I16 to the control input of S11. The Q output of FF16 is applied to the control inputs of S13 and S15 and through I15 to the control input of S14. Finally, the Q output of FF17 is applied to the control input of S 12.

In operation, the reinitialize code receiver 137 of the module 37a illustrated in FIG. 20 operates in a manner generally similar to the given code reset receiver 83 of the module 37 illustrated in FIG. 3 and described above. More specifically, when the module player produces a predetermined reinitialize code, the control output of the reinitialize code receiver 137 shifts from a binary zero state to a binary one state, resetting FF15, FF16, and a plurality of flip-flops included in the search code register 133, and setting FF17. Resetting FF15 opens S10 and closes S11. Resetting FF16 closes S13 and setting FF17 opens S12. After the reinitialization code is transmitted, the module player sends a predetermined given code request code, which is received by the given code request receiver 127. The code may be, for example, 1001. Upon receipt of this code, the control output of the given code reset receiver 127 shifts from a binary zero state to a binary one state, closing S9. Closing S9 results in the code stored in the pre-programmed code block 129 being returned to the module player via S9, S11, and four lines of the output bus 73. The same shift, shortly after the pre-programmed code is transmitted, sets FF15, closing S10 and opening S11.

The module player responds to receipt of the pre-programmed code by applying the same (pre-programmed) code to the input bus 71. This code passes through S14 (which is closed because FF16 is reset), the search code input block 141, the given code request input block 143, and the reinitialization code input block 155, and is received by and stored in the search code register 133 of the first module. The returned pre-programmed code is also sent to downstream modules via S10, which is now closed. Thus, the pre-programmed code is uploaded to the search code registers 133 of all modules. However, only the module having the pre-programmed code stored in its pre-programmed code block will respond. More specifically, since the codes stored in the search code register of this module is now the same as the pre-programmed code, the control output of the code-comparing logic 135 of this module only will shift from a binary zero state to a binary one state, setting FF16. Setting FF16 closes S13 and S15 and opens S14 (via 115). As a result, the memory 103 is connected to the lines of the input section 71a of the input bus 71. The module player now uploads the basic content code stored in the memory 103, i.e., the data that defines the nature of the audio/video works stored in the memory 103. Thereafter, a search code reset code is generated by the module player and applied to the input bus 71. This code is received by the search code reset receiver 131. Upon receipt of the search code reset code, the control output of the search code reset receiver 131 shifts from a binary zero state to a binary one state, resetting the search code register 133, resetting FF16, and setting FF17. This shift in the control output of the search code reset receiver 131 is prevented from resetting FF15 by D3.

Resetting the search code register 133 causes all of the outputs of the search code register to drop to a binary zero state. Setting FF17 closes S12 and resetting FF16 opens S13 and S15 and closes S14.

The given code, reinitialization code, and search code reset code are all prevented from being applied to the search code register by the search code input block 141, the given code input block 143, and the reinitialization code input block 145, respectively. Thereafter, the process is repeated for subsequent modules until the basic content code describing the contents of each of the modules is received by the module player and stored for access by a user.

Playback is accomplished in generally the same manner previously described with respect to the module 37 illustrated in FIG. 3. When a user makes a selection, the module player produces the pre-programmed code associated with the module containing the user's selection. This code is applied to the input data bus 71, received by all modules and stored in the search code registers 133 of all of the modules. However, only the control output of the code-comparing logic 133 of the module having the same program code in its pre-programmed code block 129 will shift from a binary zero state to a binary one state, setting FF16. Setting FF16 closes S13, opens S14, and closes S15. Closing S13 results in the search code being sent back to the module player via S12, S13, the search code output trigger, and the appropriate four lines of the output bus 73. Closing S15 allows the module player access to the memory of the responding module and playback to occur in the manner previously described.

While logic suitable for forming several of the elements of the module 37a illustrated in FIG. 18 is different from logic suitable for forming elements of the module 37 illustrated in FIG. 3, some elements can be formed by similar logic. Elements that can be formed by similar logic include the search code reset receiver 131, the search code register 133, the search code output trigger 139, the search code input block 141, and the reinitialization code input block 145. The search code reset receiver 131 can be formed by the same logic as the search code reset receiver 85, shown in FIG. 6. The search code register 133 can be formed by the same logic as the search code register 89 shown in FIG. 7. The reinitialize code input block 145 can be formed by the same logic as the given code reset input block 95 shown in FIG. 10. The search code output trigger 139 can be formed by the same logic as the search code output trigger 97 illustrated in FIG. 11. And the search code input block 141 can be formed by the same logic as the search code reset input block 99 shown in FIG. 12. As a result, these elements are not further described.

Figure 21:
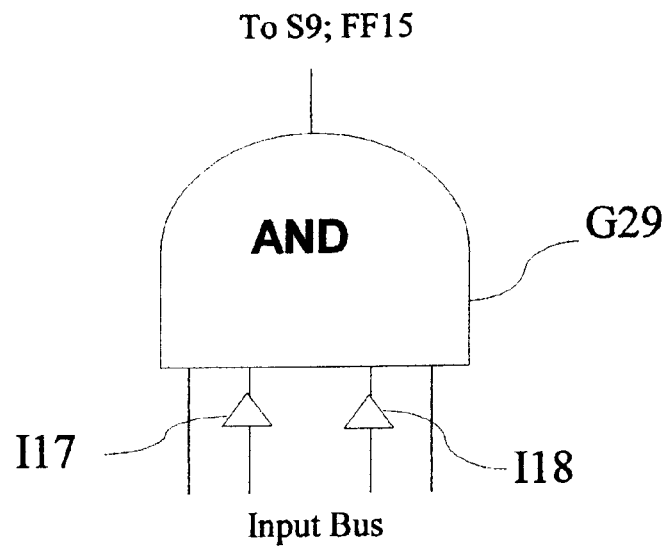
FIG. 21 is a logic diagram of a given code request receiver suitable for use in the module illustrated in FIG. 20.

A given code request receiver 127 suitable for use in the module 37a is illustrated in FIG. 21. The given code request receiver illustrated in FIG. 19 includes a single four-input AND gate designated G29 and two inverters designated I17 and I18. The inputs of G29 are connected to the lines of the input section 71a of the input bus 71, two through I17 and I18. I17 and I18 are located such that G29 responds to the given code request code, 1001 in the illustrated example.

As illustrated in FIG. 22, the pre-programmed code 129 may comprise a power supply connected such that ground or a voltage is applied to each of the four output lines of the pre-programmed code 129, depending upon the code to be produced by the pre-programmed code 129. For purposes of illustration, the power supply is illustrated as four separate power supply elements 151a, 151b, 151c, and 151d connected to ground through a resistor with the connection to the individual lines of the output of the pre-programmed code 129 connected to either ground or the output of the power supply.

FIG. 23 illustrates code-comparing logic 135 suitable for use in the module 37a illustrated in FIG. 20. The code-comparing logic illustrated in FIG. 23 comprises four two-input exclusive NOR gates designated G30, G31, G32, and G33 and a four-input AND gate designated G34. The output of one of the signal lines of the pre-programmed code block 129 is connected to one input of each of G30, G31, G32, and G33. The output of one of the registers of the search code register 133 is connected to the other input of each of G30, G31, G32, and G33. The outputs of G30, G31, G32, and G33 are connected to one of the inputs of G34. As a result, when the outputs of the pre-programmed code block 129 and the search code register 133 are all the same, the output is in a binary one state, setting FF16 in the manner previously described.

FIG. 24 illustrates logic suitable for forming the reinitialize code receiver 137 of the module illustrated in FIG. 20. The reinitialize code receiver 137 illustrated in FIG. 24 includes a four-input AND gate designated G35, four two-input AND gates designated G36, G37, G38, and G39 and two inverters designated 122 and 123. The four lines of the input section 71a of the input bus 71 are connected to the four inputs of G35, two through 122 and 123. As a result, the output of G35 shifts from a binary zero state to a binary one state when a predetermined input code, 1010 in the case of the initialized code receiver 137 illustrated in FIG. 24, occurs. The output of G35 is connected to one of the inputs of each of G36, G37, G38, and G39. The lines of the input section 71a of the input bus 71 are each connected to one of the other inputs of G36, G37, G38, and G39. The output of G35 is the control output of the reinitialize code receiver 137 illustrated in FIG. 20 and described above. As a result, when the appropriate code (1010) is applied to the reinitialize code receiver 137 control output, i.e., the output of G35 shifts from a binary zero state to a binary one state, setting and resetting other elements of the module 37a in the manner previously described with respect to FIG. 20. Further, the binary one output of G35 enables G36, G37, G38, and G39, allowing the received code (1010) to be applied to the lines of the output section 71b of the input bus 71. All other codes place the output of G35 in a binary zero state, disabling G36, G37, G38, and G39. As a result, these gates do not pass any signal other than the selected reinitialization code.

Figure 25:
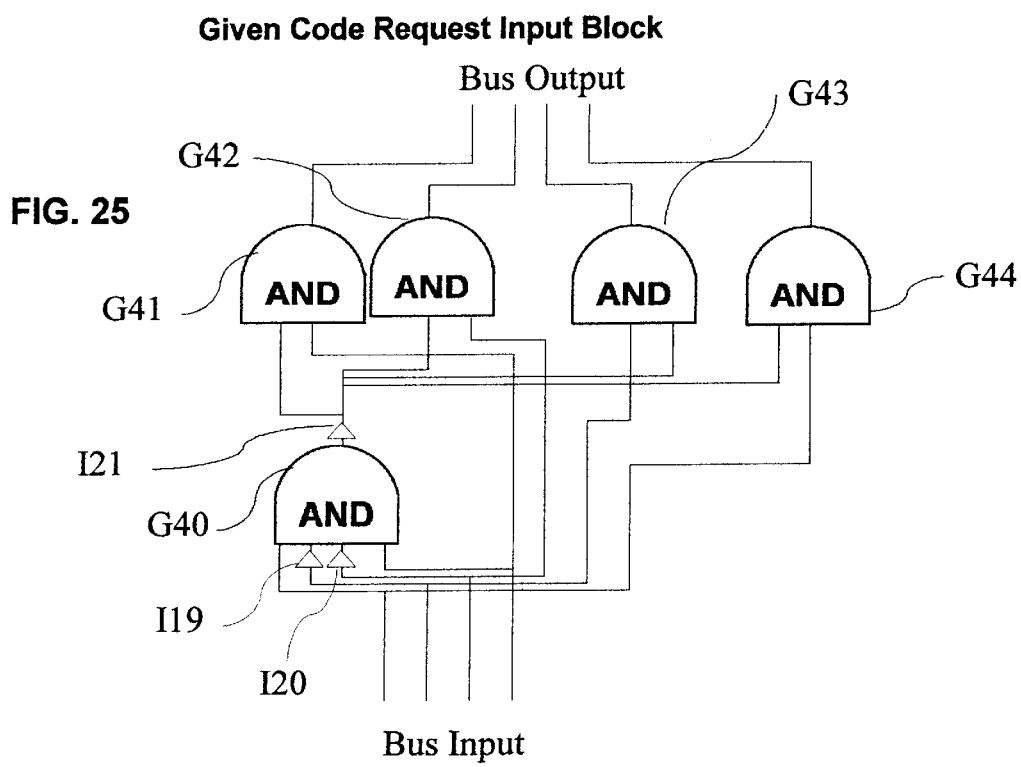
FIG. 25 is a logic diagram of a given code request input block suitable for use in the module illustrated in FIG. 20.

FIG. 25 illustrates a logic suitable for forming the given code request input block 143 of the module illustrated in FIG. 125. The logic illustrated in FIG. 25 includes a four-input AND gate designated G40; four two-input AND gates designated G41, G42, G43, and G44; and three inverters designated I19, I20, and I21. The inputs received by the given code request input block 143 illustrated in FIG. 3 are applied to the inputs of G40, two through I19 and I20. One of these inputs is also applied to an input of each of G41, G42, G43, and G44. The output of G40 is connected through I21 to the other inputs of G41, G42, G43, and G44. As with the search code input block 141 (FIG. 12) and the reinitialize code input block 145 (FIG. 10), the output of G40 shifts from a binary zero state to a binary one state when a particular input code (1001 in the illustrated embodiment) is received by the given code request input block 143. When this shift in the output of G40 occurs, the output of I21 shifts from a binary one state to a binary zero state, disabling G41, G42, G43, and G44. No other code, except for the code "recognized" by G40, disables G41, G42, G43, and G44. As a result, all other codes pass through the given code request input block 143 illustrated in FIG. 25.

As will be readily appreciated by those skilled in the art and others, the modules illustrated in FIGS. 3 and 20 should be considered as exemplary, not limiting. For ease of illustration and description, the various components of the modules have been illustrated in functional block diagram form. However, it is to be understood that actual embodiments of the invention can vary. As an alternative to individual functional elements, the illustrated and described logical functions could be embodied in an application-specific integrated circuit (ASINC), for example. Alternatively, some or all of the logical functions could be performed in software. Further, many of the logic functions can be performed in other manners than as specifically illustrated, i.e., using gates other than AND, exclusive NOR, and exclusive OR, if desired. Further, various other types of flip-flops can be utilized. Other types of data storage registers can also be used. In this regard, for ease of illustration, as noted above, the clock timing normally associated with the flip-flops and registers is not depicted in the majority of the figures; however, as those skilled in the art will recognize, such clocking will likely be required in most actual embodiments of the invention. Further, it is to be understood that this invention is not limited to module players of the type illustrated in FIG. 1. The module player can take the form of an internal computer card, an external computer component, a stand-alone audio player, such as a car radio, Walkman-type audio player, or audio/video stereo, or a stereo and/or video component which is plugged into a stereo, another stereo component or monitor. These and other unmentioned systems all fall within the scope of the invention. Thus, the term module player should be construed as any component into which a module pack and modules can be plugged for playback and display of the contents of the modules. External components not integral to the module player itself which are involved in the processing or display of the information from the modules are to be considered part of the module player. Hence, while the presently preferred embodiments of the invention have been illustrated and described, it is to be understood that, within the scope of the independent claims, the invention can be practiced otherwise than as specifically described herein.

The embodiments of the invention in which an exclusive property or privilege is claimed are defined as follows:

1. An electronic memory playback system for reading and playing back electronically stored audio and/or video data, said electronic memory playback system comprising:
    a plurality of memory modules for electronically storing audio and/or video data;
    a plurality of module packs daisy chained together, each of said module packs including a plurality of receptacles for receiving said plurality of memory modules;
    a module player coupled to said at least one module pack for reading said memory modules stored in said at least one module pack and playing back electronically stored audio and/or video data; and
    a data bus included in said at least one module pack for coupling said plurality of memory modules received by receptacles to said memory module player, said data bus also includes a segmented input bus and a continuous output bus.

2. An electronic memory playback system for reading and playing back electronically stored audio and/or video data, said electronic memory playback system comprising:
    a plurality of memory modules for electronically storing audio and/or video data;
    a plurality of modules for accepting foreign memory storing audio and/or video data;
    at least one module pack including a plurality of receptacles for receiving said plurality of memory modules;
    a module player coupled to said at least one module pack for reading said memory modules stored in said at least one module pack and playing back electronically stored audio and/or video data; and
    a data bus included in said at least one module pack for coupling said plurality of memory modules received by receptacles to said memory module player, said data bus including a segmented input bus and a continuous output bus, said continuous output bus is formed by a plurality of continuous segments mounted in said module pack receptacles.

3. An electronic memory playback system for reading and playing back electronically stored audio and/or video data, said electronic memory playback system comprising:
    a plurality of memory modules for electronically storing audio and/or video data, each of said plurality of memory modules comprising (a) an array of memory integrated circuits for electronically storing audio and/or video data, said array of memory integrated circuits comprise a plurality of memory blocks, each of said memory blocks being accessed through a single memory address line; and (b) control logic for (i) receiving an initialization code from said module player that initializes said memory module, (ii) storing a memory module access code, and (iii) providing said module player access to the audio and/or video data electronically stored in said array of memory integrated circuits upon receipt of said access code;
    a plurality of modules for accepting foreign memory storing audio and/or video data;
    at least one module pack including a plurality of receptacles for receiving said plurality of memory modules;
    a module player coupled to said at least one module pack for reading said memory modules stored in said at least one module pack and playing back electronically stored audio and/or video data; and
    a data bus included in said at least one module pack for coupling said plurality of memory modules received by receptacles to said memory module player.

4. An electronic memory playback system for reading and playing back electronically stored audio and/or video data, said electronic memory playback system comprising:
    a plurality of memory modules for electronically storing audio and/or video data;

at least one module pack including a plurality of receptacles for receiving said plurality of memory modules;

a module player coupled to said at least one module pack for reading said memory modules stored in said at least one memory module pack and playing back electronically stored audio and/or video data, said module player comprising (i) a processor for sending and receiving control codes to and from said plurality of memory modules received by said at least one module pack, and (ii) a memory for storing basic content code downloaded from said plurality of memory modules, said basic content code being downloaded to said module player during an initialization routine; and a data bus included in said at least one module pack for coupling said plurality of memory modules received by receptacles to said memory module player.

5. An electronic memory playback system for reading and playing back electronically stored audio and/or video data, said electronic memory playback system comprising:

a plurality of memory modules for electronically storing audio and/or video data;

at least one module pack including a plurality of receptacles for receiving said plurality of memory modules;

a module player coupled to said at least one module pack for reading said memory modules stored in said at least one memory module pack and playing back electronically stored audio and/or video data, said module player comprising (i) a processor for sending and receiving control codes to and from said plurality of memory modules received by said at least one module pack, said processor retrieving, sorting, and converting said basic content code downloaded from said plurality of memory modules based on user-determined playback options, and (ii) a memory for storing basic content code downloaded from said plurality of memory modules, said basic content code being downloaded to said module player during an initialization routine; and a data bus included in said at least one module pack for coupling said plurality of memory modules received by receptacles to said memory module player.

6. An electronic memory playback system for reading and playing back electronically stored audio and/or video data, said electronic memory playback system comprising:

a plurality of memory modules for electronically storing audio and/or video data;

a plurality of module packs daisy chained together, each of said module packs including a plurality of receptacles for receiving said plurality of memory modules;

a module player coupled to said at least one module pack for reading said memory modules stored in said at least one memory module pack and playing back electronically stored audio and/or video data; and a data bus included in said at least one module pack for coupling said plurality of memory modules received by receptacles to said memory module player, said data bus including a segmented input bus and a continuous output bus.

7. An electronic memory playback system for reading and playing back electronically stored audio and/or video data, said electronic memory playback system comprising:

a plurality of memory modules for electronically storing audio and/or video data, each of said plurality of memory modules comprising (a) an array of memory integrated circuits for electronically storing audio and/or video data, said array of memory integrated circuits comprising a plurality of memory blocks, each of said memory blocks being accessed through a single memory address line; and (b) control logic for (i) receiving an initialization code from said module player that initializes said memory module, (ii) storing a memory module access code, and (iii) providing said module player access to the audio and/or video data electronically stored in said array of memory integrated circuits upon receipt of said access code;

a plurality of modules for accepting foreign memory storing audio and/or video data;

a plurality of module packs daisy chained together, each of said module packs including a plurality of receptacles for receiving said plurality of memory modules;

a module player coupled to said at least one module pack for reading said memory modules stored in said at least one memory module pack and playing back electronically stored audio and/or video data; and a data bus included in said at least one module pack for coupling said plurality of memory modules received by receptacles to said memory module player.

8. An electronic memory playback system for reading and playing back electronically stored audio and/or video data, said electronic memory playback system comprising:

a plurality of memory modules for electronically storing audio and/or video data;

a plurality of module packs daisy chained together, each of said module packs including a plurality of receptacles for receiving said plurality of memory modules;

a module player coupled to said at least one module pack for reading said memory modules stored in said at least one memory module pack and playing back electronically stored audio and/or video data, comprising (i) a processor for sending and receiving control codes to and from said plurality of memory modules received by said module packs, and (ii) a memory for storing basic content code downloaded from said plurality of memory modules, said basic content code being downloaded to said module player during an initialization routine; and a data bus included in said at least one module pack for coupling said plurality of memory modules received by receptacles to said memory module player.

9. An electronic memory playback system for reading and playing back electronically stored audio and/or video data, said electronic memory playback system comprising:

a plurality of memory modules for electronically storing audio and/or video data;

a plurality of module packs daisy chained together, each of said module packs including a plurality of receptacles for receiving said plurality of memory modules;

a module player coupled to said at least one module pack for reading said memory modules stored in said at least one memory module pack and playing back electronically stored audio and/or video data, comprising (i) a processor for sending and receiving control codes to and from said plurality of memory modules received by said module packs, (ii) a display for displaying the basic content code downloaded from said plurality of memory modules in user-understandable form, and (iii) a memory for storing basic content code downloaded from said plurality of memory modules, said basic content code is downloaded to said module player during an initialization routine; and a data bus included in said at least one module pack for coupling said plurality of memory modules received by receptacles to said memory module player.

10. An electronic memory playback system for reading and playing back electronically stored audio and/or video data, said electronic memory playback system comprising:

a plurality of memory modules for electronically storing audio and/or video data;

a plurality of module packs daisy chained together, each of said module packs including a plurality of receptacles for receiving said plurality of memory modules;

a module player coupled to said at least one module pack for reading said memory modules stored in said at least one memory module pack and playing back electronically stored audio and/or video data, and comprising (i) a processor for sending and receiving control codes to and from said plurality of memory modules received by said module packs, and sorting, retrieving, and converting said basic content code downloaded from said plurality of memory modules based on user-determined playback options, said basic content code being downloaded to said module player during an initialization routine, and (ii) a memory for storing basic content code downloaded from said plurality of memory modules; and a data bus included in said at least one module pack for coupling said plurality of memory modules received by receptacles to said memory module player.

11. A memory module for electronically storing audio and/or video data for reading and playback by an electronic memory playback system, said memory module comprising:

an array of integrated circuits suitable for electronically storing audio and/or video data;

an output bus interface for coupling said array of integrated circuits to an output bus;

an input bus interface for coupling said array of integrated circuits to an input bus; and control logic for selectively receiving and sending initialization, access, and search codes, comprising (i) a reset receiver for resetting said control logic upon receipt of a reset control code, (ii) an access code register for storing an access code, and (iii) a search code register for storing a search code.

12. A memory module for electronically storing audio and/or video data for reading and playback by an electronic memory playback system, said memory module only being accessed upon receipt of an access code, said access code permanently stored in said memory module, said memory module comprising:

an array of integrated circuits suitable for electronically storing audio and/or video data;

an output bus interface for coupling said array of integrated circuits to an output bus;

an input bus interface for coupling said array of integrated circuits to an input bus; and control logic for selectively receiving and sending initialization, access, and search codes, comprising (i) a reset receiver for resetting said control logic upon receipt of a reset control code, (ii) an access code register for storing an access code, and (iii) a search code register for storing a search code.

13. A module pack comprising:

a plurality of receptacles, each of said plurality of receptacles for receiving a memory module; and a data bus for coupling said memory modules received by said plurality of receptacles, and complimentary connectors to daisy chain a plurality of said module packs, said data bus being a partially segmented data bus, said partially segmented data bus comprising (i) an input bus formed by a plurality of discontinuous segments mounted in said module pack receptacles that are connected together by memory modules received by said module pack receptacles and (ii) an output bus formed by a plurality of continuous segments mounted in said module pack receptacles.

* * * * *